United States Patent
Ruggieri et al.

(10) Patent No.: US 11,515,767 B2
(45) Date of Patent: Nov. 29, 2022

(54) APPARATUS AND METHOD FOR PRE-ASSEMBLING WINDING SETS OF A WINDING BAR FOR ELECTRIC MACHINE STATOR OR ROTOR

(71) Applicant: TECNOMATIC SPA, Corropoli (IT)

(72) Inventors: Giovanni Ruggieri, Corropoli (IT); Sergio Tancredi, Corropoli (IT); Maurilio Micucci, Corropoli (IT); Giuseppe Ranalli, Corropoli (IT)

(73) Assignee: TECNOMATIC SPA, Corropoli (IT)

( * ) Notice: Subject to any disclaimer, the term of this patent is extended or adjusted under 35 U.S.C. 154(b) by 141 days.

(21) Appl. No.: 16/968,816

(22) PCT Filed: Apr. 19, 2019

(86) PCT No.: PCT/IB2019/053273
§ 371 (c)(1),
(2) Date: Aug. 10, 2020

(87) PCT Pub. No.: WO2019/207448
PCT Pub. Date: Oct. 31, 2019

(65) Prior Publication Data
US 2021/0006141 A1    Jan. 7, 2021

(30) Foreign Application Priority Data
Apr. 23, 2018 (IT) .......................... 102018000004780

(51) Int. Cl.
*H02K 15/06* (2006.01)
*H02K 15/04* (2006.01)

(52) U.S. Cl.
CPC ........... *H02K 15/063* (2013.01); *H02K 15/04* (2013.01)

(58) Field of Classification Search
CPC .............................. H05K 15/04; H05K 15/063
See application file for complete search history.

(56) References Cited

U.S. PATENT DOCUMENTS 4,477,966 A * 10/1984 Napierski ............ H02K 15/068
29/736
5,060,364 A * 10/1991 Scherer .............. H02K 15/0018
29/734

(Continued)

FOREIGN PATENT DOCUMENTS

JP     2000278920 A  * 10/2000
JP     2003 134751       9/2003

(Continued)

OTHER PUBLICATIONS

International Search Report and Written Opinion of the International Searching Authority, PCT/IB2019/053273 European Patent Office, dated Oct. 1, 2019.

(Continued)

*Primary Examiner* — Carl J Arbes
(74) *Attorney, Agent, or Firm* — Valauskas Corder LLC

(57) ABSTRACT

An apparatus for pre-assembling a winding for an electric machine stator or rotor includes a plurality of hairpins with two legs having non-circular cross-section, a ring including a plurality of slots and an outer containment ring acting in containment along the perimeter of the ring. An inner cam block and an outer cam block, surrounding and radially facing the inner cam block, are arranged opposite to the exit face of the ring. The cams are adapted to be crossed, in use, by the two legs when they cross the ring at the same time; the cams open into a free circular space between the two cam blocks. A method for pre-assembling a winding set for an electric machine stator or rotor is also provided. Hairpins are inserted in sequence in the slots of the apparatus. A finished winding set positioned in the free circular space is obtained by successive rotations of the ring.

33 Claims, 19 Drawing Sheets

(56) References Cited

U.S. PATENT DOCUMENTS

| | | | | |
|---|---|---|---|---|
| 5,542,456 | A * | 8/1996 | Nishimura | H02K 15/0068 140/92.1 |
| 6,141,865 | A * | 11/2000 | Kakutani | H02K 15/10 29/733 |
| 6,557,238 | B1 * | 5/2003 | Becherucci | H02K 15/0062 140/92.1 |
| 7,370,401 | B2 * | 5/2008 | Stratico | H02K 15/068 29/736 |

FOREIGN PATENT DOCUMENTS

| | | |
|---|---|---|
| JP | 2004 072839 | 4/2004 |
| JP | 3 975891 | 12/2007 |
| JP | 2012 151996 | 9/2012 |

OTHER PUBLICATIONS

English translation of cited reference Japan Pat. Doc. 2000278920 (Sawada).

* cited by examiner (a) (b)

FIG.31

APPARATUS AND METHOD FOR
PRE-ASSEMBLING WINDING SETS OF A
WINDING BAR FOR ELECTRIC MACHINE
STATOR OR ROTOR

CROSS-REFERENCE TO RELATED
APPLICATIONS

This application is a U.S. National Phase filing of PCT International Patent Application No. PCT/IB2019/053273, having an international filing date of Apr. 19, 2019, which claims priority to Italian Patent Application No. 102018000004780, filed Apr. 23, 2018 each of which is hereby incorporated by reference in its entirety.

FIELD OF THE INVENTION

The present description relates to the field of processes and apparatuses for pre-assembling winding sets of electric bar conductors to be used in stators and rotors of electric machines, such as electric motors.

BACKGROUND ART

It is generally known to provide stators or rotors of electric machines, such as generators or electric motors, e.g. for applications on hybrid electric vehicles (HEVs), in which the stator or rotor winding is formed by a plurality of bar conductors bent and variously interconnected to one another to make electric windings also known as "bar windings" or "winding sets". Such bent bar conductors are also known as "hairpin conductors" or simply "hairpins", with one or more legs joined as a bridge to one end. Individual "layers" can be distinguished in bar windings, each of which is formed by a circular array of equidistant positions placed at the same radial distance from the winding axis, as well as sets of conductors, comprising hairpins of a single type either right-handed or left-handed (according to the following definitions), so that their legs occupy most of the positions of a layer. The sets of the described type having maximum cardinality in the winding set are called "crowns". Bar windings may be constituted, in some cases, by one or more concentric crowns.

In particular, windings with hairpins having a circular cross-section (also said "round-wire conductors") or rectangular cross-section belong to the state of the prior art. In this regard, "rectangular" or "square" conductor wire means in this description a wire having four substantially flat sides, each joined to the adjacent sides, typically by a rounded edge. Bar conductors having a trapezoidal-shaped cross-section are known.

The aforesaid basic conductors are usually preformed by means of bending in a "U" or a "P" shape, starting from straight bar conductors. U.S. Pat. No. 7,480,987 describes an example of a method for preforming straight bar conductors to form hairpins. "U" or "P"-shaped preformed conductors, often also called "preformed basic conductors" in the technical field, typically have two adjacent legs, of equal or different length, each provided with a free end portion and an opposed end portion, which is connected, by means of a connecting portion, to the other leg.

With reference to FIG. 2(a), a hairpin 255 is preformed starting from a linear conductor (not shown), by bending it to form a first leg 255a with a respective free end 255aE and a second leg 255b with a respective free end 255bE. The bending shape forms at the same time a bridge-like connection 255C between the two legs 255a, 255b. This preformed hairpin in this example has a shape of a flattened "U". In order to form a stator of an electric machine, for example, it is known to subject the "U" or "P"-shaped preformed bar conductors to two different types of twisting.

In a first type of twisting, also called "twisting from the insertion side", the preformed basic conductors are adequately inserted in corresponding radially aligned pockets or "slots", which are provided in a twisting device, adapted to deform such conductors after insertion. The twisting device is substantially used to spread the legs of the "U" or "P" shape so that the two legs of each conductor, after having extracted the conductor from the device, can be successively inserted into a corresponding pair of slots of a stator core which are mutually angularly offset by a predetermined linear distance, which is substantially equal to the distance between the offset legs.

Starting from a preformed hairpin, for example but not exclusively as shown in FIG. 2(a), a hairpin of suitable shape for its insertion into the stator (or rotor) is formed by spreading the legs 255a, 255b and shaping the bridge-like connection 255c, to obtain the shape in FIG. 2(b), for example. Reference numeral 255p indicates the pitch of the hairpin, i.e. the linear distance, or the angular distance (opening), or the distance in terms of slot pitches, between the legs. It is worth noting that the central top 255c2 of the formed hairpin is the zone in which the cross-section of the conductor is subjected to a 180° rotation either with respect to the medial surface of the hairpin (surface which passes inside the hairpin and includes the two legs) or with respect to X axis.

Patent application published as US 2009/0178270 discloses an example of a twisting method from insertion side for the twisting of the preformed bar conductors at a uniform pitch after having inserted them into the pockets of a twisting device, in which the hairpins have a rectangular cross-section.

According to the prior art and with reference to FIG. 3b, the hairpins may also be obtained by stamping, i.e. a straight conductor is pressed against a contrast in a punch-and-die type system. FIG. 3b(a) shows such a stamped conductor; it does not display a cross-section which rotates with respect to the median surface of the hairpin. This stamped hairpin or also a preformed hairpin may be subjected to twisting on welding side, in which case it is possible to introduce the aforesaid rotation and a "step-like" shape of the legs 255a and 255b, in which, for example, the leg 255a has a first straight portion 255a1, a step-shape portion 255a2 and a second straight portion 255a3, as shown in FIG. 3b(b).

Referring to FIG. 3c, the shape of the bridge connection 255c may comprise three portions 255c1, 255c3 and 255c2 starting from the connection to the second leg 255b and finishing at the connection to the first leg 255a (hidden in the view in FIG. 3c). Portion 255c1 has a main extension direction B and a curvature radius $R_B$, portion 255c3 has a main extension direction A and a curvature radius R, portion 255c2 has a main extension direction C (and possibly a curvature). Reference $\alpha_1$ indicates the angle between directions A and C, reference $\alpha_2$ indicates the angle between directions A and B and reference $\alpha_3$ indicates the angle between directions B and C, equal to the sum of the angles $\alpha_1$ and $\alpha_2$. This is only one of the final possible shapes of a hairpin, all other shapes with different portions and conformations of both the bridge-like portion and of the legs can be used with the apparatus and a method according to the present description.

Moreover, there are conductors called "I-pins", which have a single straight portion in stretches (in general, a single appropriately shaped leg between a first and a second end) housed in slot; they are used as phase terminals in patent U.S. Pat. No. 7,622,843 B2. W-shaped conductors are also known, see for example patent U.S. Pat. No. 7,622,843 B2. A W-shaped conductor may be formed by welding a stamped hairpin with an I-pin or by welding a fourth conductor to three I-pins. In general, hereinafter "W-pin" will mean a conductor with at least three legs connected by a same side by means of a bridge-like connection. At least one leg of said three or more legs will be used in appropriate cams.

Furthermore, and referring to FIG. 3d, there are stranded hairpins with tipped cross section at the bending point (FIG. 3d (a)) or with continuous transposition along the hairpin portions housed in slot (FIG. 3d (b); U.S. Pat. No. 3,837,072). A variant, not shown, may be a similar hairpin without tipping.

FIG. 3e shows the possible arrangement of the legs of the hairpins of a double crown winding in different positions in slot. Reference letters A and B indicate the crown to which the legs shown in slot (belonging to different hairpins) belong. The layers of the slot of a stator which houses a winding hairpin are the portions of the slot itself occupied by a single leg, in radial direction, obtained by subdividing the slot in the same direction. Some of the possible arrangements of the hairpins in the slot are AABB, ABBA and ABAB. See patent U.S. Pat. No. 6,894,417 B2 in this regard.

The radial extension of a hairpin with respect to the stator axis is the distance in radial direction between its legs, measured in terms of slot layers. For example, the radial extension of a hairpin having AABB winding, or of the crown B of a winding ABBA is equal to a single layer, its legs belonging to adjacent layers. The radial extension of the hairpins of an ABAB type winding is equal to 2 layers. The radial extension of a hairpin of crown A of an ABBA type winding is equal to 3 layers. Hairpins with no radial extension are also possible, i.e. having legs on the same layer.

Hereafter, the word "hairpin" will encompass all aforesaid types of "basic conductors".

After having been subjected to the first type of twisting or after they have been stamped, the basic conductors are typically pre-assembled in a winding set as mentioned above. The pre-assembly apparatus will have a series of slots in which to insert the legs of each hairpin and will generally be different from the twisting device.

The winding set it then inserted as a block into the slots of the stator core through a first side thereof (so-called "insertion side" or "insertion face") with the respective free end portions protruding from a second side of the core (so-called "welding side" or "connection side" or "welding face" or "exiting face") opposite to the first side.

On the basis of the specific winding pattern to be achieved, the free end portions of the basic conductors protruding from the welding side may be subjected to a second type of twisting, also named "twisting from welding side", e.g. after having been inserted in pockets made in appropriate twisting fixture. The twisting fixture herein has the purpose of bending or twisting the free end portions of the conductors to appropriately shape such end portions and consequently make it possible to perform the appropriate electric connections between the conductors in order to complete the winding. Patent application published under number US 2009/0302705 describes an example of a twisting method from welding side of the type discussed above.

By way of example, FIG. 1 shows a pre-assembling apparatus according to the prior art, which is applied to produce a winding set before it is inserted in a stator or a rotor (in particular for starter motors). Such apparatus or device or assembly 100 uses concentric rings 140, 190 of hairpins 110 having circular section, already spread, in particular so that each conductor displays the respective legs apart by an angle corresponding to the angular distance between the two slots of the stator core in which they will be inserted. Reference numerals 120 and 180 indicate the "slots" or "pockets" for vertically supporting the legs of the hairpins. In particular, the pockets 120 are used to provide vertical support while loading the hairpins, prior to rotation. Reference numeral 150 is the reference for the axis of the pre-assembling device and reference numeral 160 is the rotation direction for the pre-assembling of the winding set 170. The slots are provided on concentric rings 140 and 190, superimposed in axial direction with a third concentric element 195 in which radial extending guides are present which guide the movement of the legs initially housed in the pockets 120. During said rotation, the ring 140 and the element 195 rotate rigidly with respect to the ring 190, i.e. the ring 190 rotates with respect to both the ring 140 and the element 195. At the beginning of said rotation, the upper portion of the leg of each hairpin which is housed in the slot 120 emerges from said slot, which is axially superimposed at a guiding end of the element 195, the low portion of the leg itself remaining in said guide which constrains the movement thereof until the leg is approached to the ring 190.

The rotation direction is related to the direction (clockwise/counterclockwise) of the bend (hereinafter, "bending direction") in the connecting portion between the legs of the hairpin, viewed by an observer placed on the fixed leg. Such a bend is needed for passing the hairpin from one layer to the other, for example. In general, the bending direction may be leftwards or rightwards. In one case, observing the hairpin from above inserted in the stator, the portion of the bridge-like connection situated on the left of the bend is farther from the stator axis. In the same case, the left leg is farther from the stator axis. In the other case, the right leg and the portion of the bridge-like connection to the right of the bend will be farther from the stator axis. The bend is in the two cases also qualitatively specular with respect to a plane passing through the two legs.

With the device in FIG. 1, all the hairpins 110 inserted to assemble the winding are rotated simultaneously. The fulcrum of such rotation is the inner leg of each hairpin (i.e. the leg in the roller—third concentric element 195), so as to approach the conductors to one another and assemble the winding set or crown of conductors. Such device can be conveniently used for round wire conductors, while it is not adapted to be used, for example, with bar conductors having a cross-section different from circular shape, e.g. such as "rectangular" and "trapezoidal" conductors. Indeed, the rotation of such conductors with non-circular cross-section in a circular slot would not be very smooth and would entail a risk of damaging the hairpin. The use of bushings to make the section of the pockets from rectangular to circular or of pockets having rectangular cross-section would be complex and also, due to the non-null thickness of the walls which would surround the legs of the hairpin, would not make it possible to take the hairpin completely to the final pre-assembly position in the hairpin crown. Indeed, with reference to FIG. 3a, guide shims 261 are provided (wall of bushing 260) to guide the legs of the basic conductors 255 when the rollers described above rotate, which as such prevent the complete closure of the hairpins in a crown 290 (the adapters from non-circular section to circular section are not shown for the sake of simplicity). This impediment is not found in the literature known to the inventors, but emerged from experimental research conducted by the inventors themselves.

According to another aspect of the prior art, since the pockets, which the aforesaid concentric guide rings 140, 190 are provided with, all have the same depth and a closed bottom, such known fixture has the drawback of not being able to be used to pre-assemble winding assemblies comprising bar basic conductors having legs of different length, a feature which may be necessary in order to achieve some kind of winding sets. Equally, the device of the prior art cannot assemble hairpins having different span/pitch (angular opening). A further drawback of the known fixture with the concentric rings described above is represented in that, in order to extract the winding set 170 made by means of such apparatus and insert it in the respective core stator or rotor, it is typically necessary to provide an additional gripper assembly to extract the winding set in block from the fixture and to insert it precisely in the stator core.

It is worth noting the word "pockets" or "slots" is used herein and in the claims in a general sense and includes slots with walls which either alone or in conjunction with other walls contain one of the two legs of the hairpin, in rotation and in translation when the apparatus is operated. Therefore, a slot can be defined both by a recess or by a depression in a member which is completely surrounded by such member and by a cavity in a member in which one or more open sides of the cavity are adapted to be effectively closed by a surface or a wall of an adjacent component. In particular, a slot can also be a blind hole or a through hole in a member.

The need is felt to suggest an alternative assembly and method with respect to those discussed above with reference to the prior art to pre-assemble a winding set of a bar winding for an electric machine which can at least partially overcome the drawbacks described above with reference to the prior art.

In particular, according to an aspect of the invention, the need is felt to provide an apparatus or device or assembly and/or a method which allows pre-assembling a winding set of a bar winding for an electric machine also with bar conductors of different type with respect to round wire conductors, which are bar conductors with circular cross-section.

Either additionally or alternatively to the aforesaid aspect, according to another aspect of the invention, the need is felt to make available an apparatus or device or assembly and a method which allow pre-assembling a winding set of a winding bar for an electric machine also with bar conductors, i.e. basic conductors as defined above, e.g. having legs of different lengths or with different span/pitch/throw.

SUMMARY OF THE INVENTION

It is an object of the present invention to provide a device or apparatus and a method for pre-assembling of one or more winding sets of a bar winding for a stator or rotor, which solve the problems and overcome the drawbacks of the prior art either entirely or partially.

It is a subject-matter of the present invention a device or apparatus and a method according to the accompanying claims.

It is a further subject-matter of the present invention a stator or rotor of electric machine, into which one or more winding sets of a bar winding obtained by means of the method of the invention are inserted, according to the accompanying stator or rotor claims.

It is yet a further subject-matter of the present invention an electric machine which uses a stator and/or a rotor obtained with the invention, according to the accompanying electric machine claim.

The claims form integral part of the present description.

DETAILED DESCRIPTION OF EXAMPLE EMBODIMENTS OF THE INVENTION

List of Drawings

The invention will now be described by way of example, with particular reference to the drawings of the accompanying figures, in which.

Figure 3A:
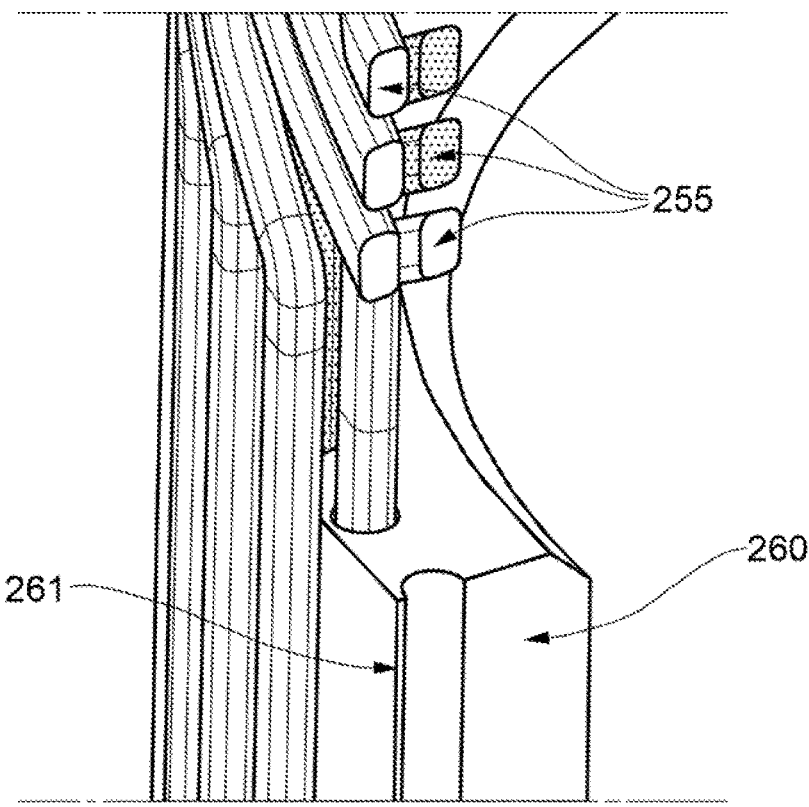
Figure 3B:
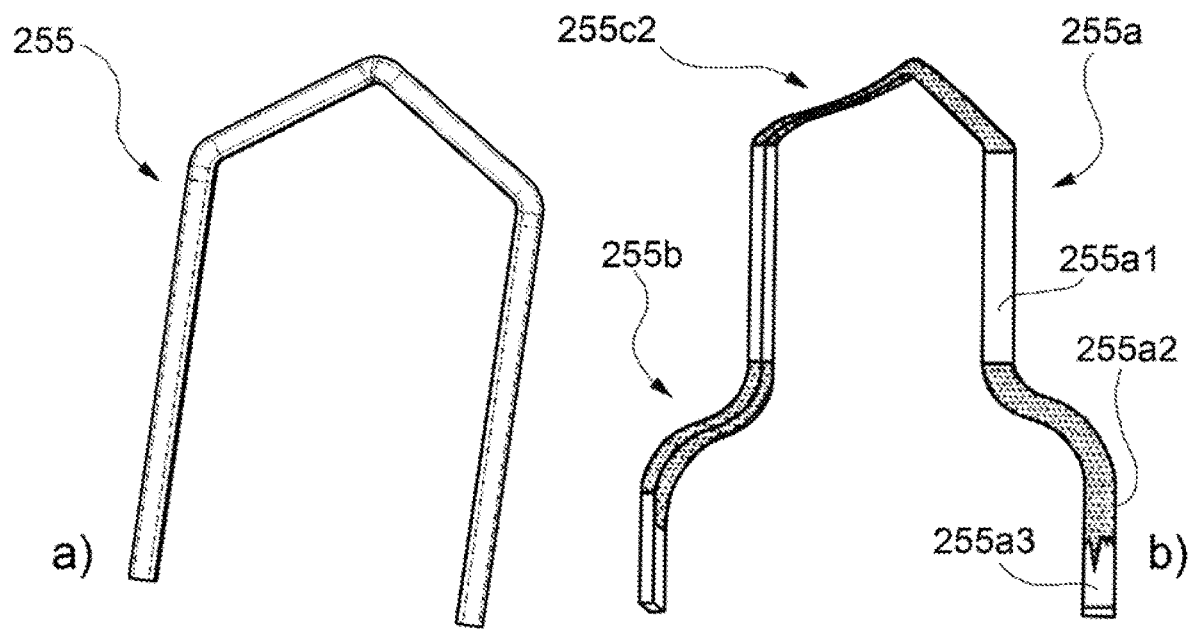
Figure 3C:
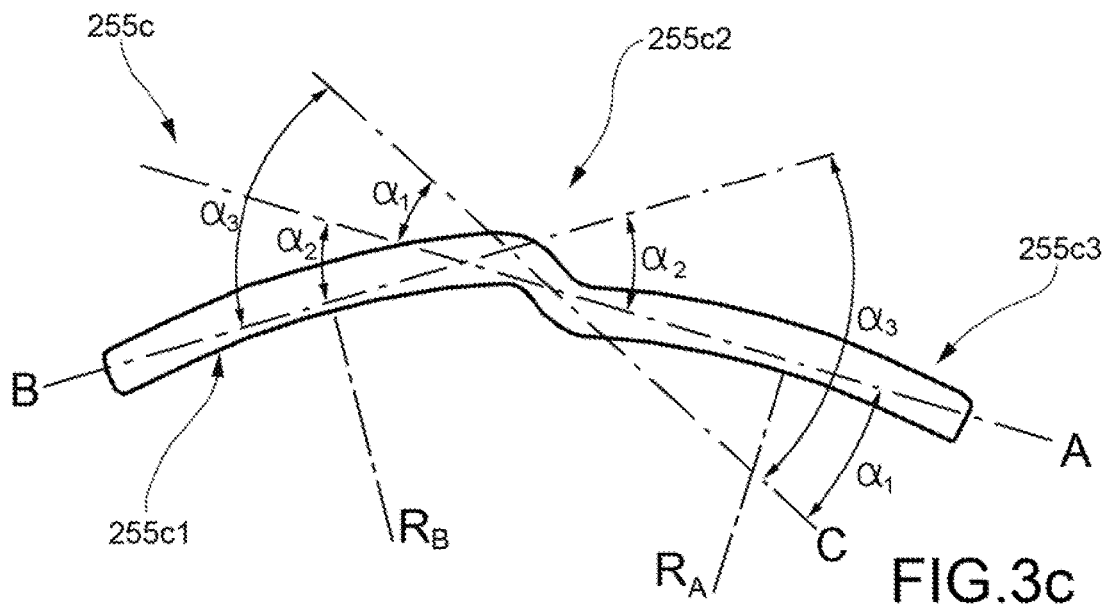
Figure 3D:
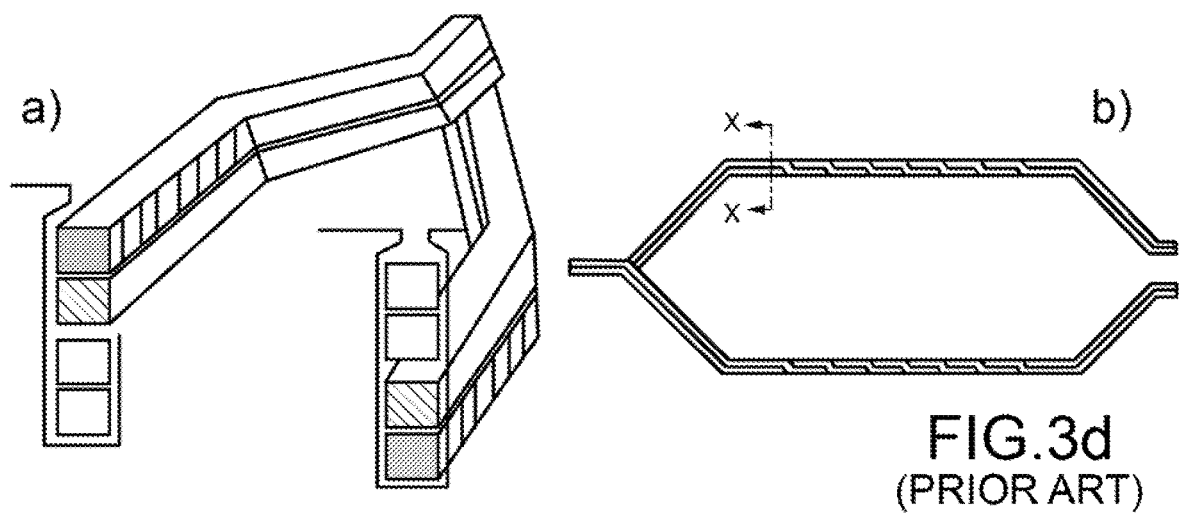
Figure 3E:
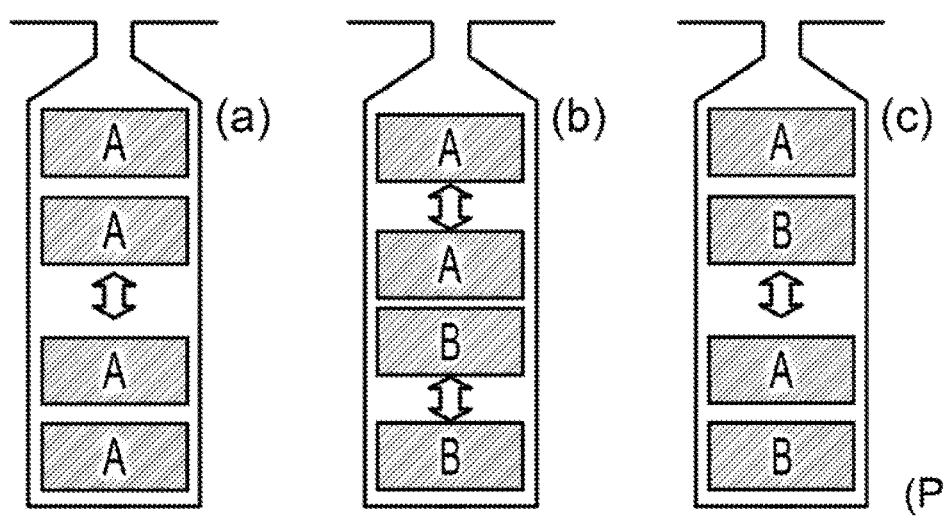
Figure 4:
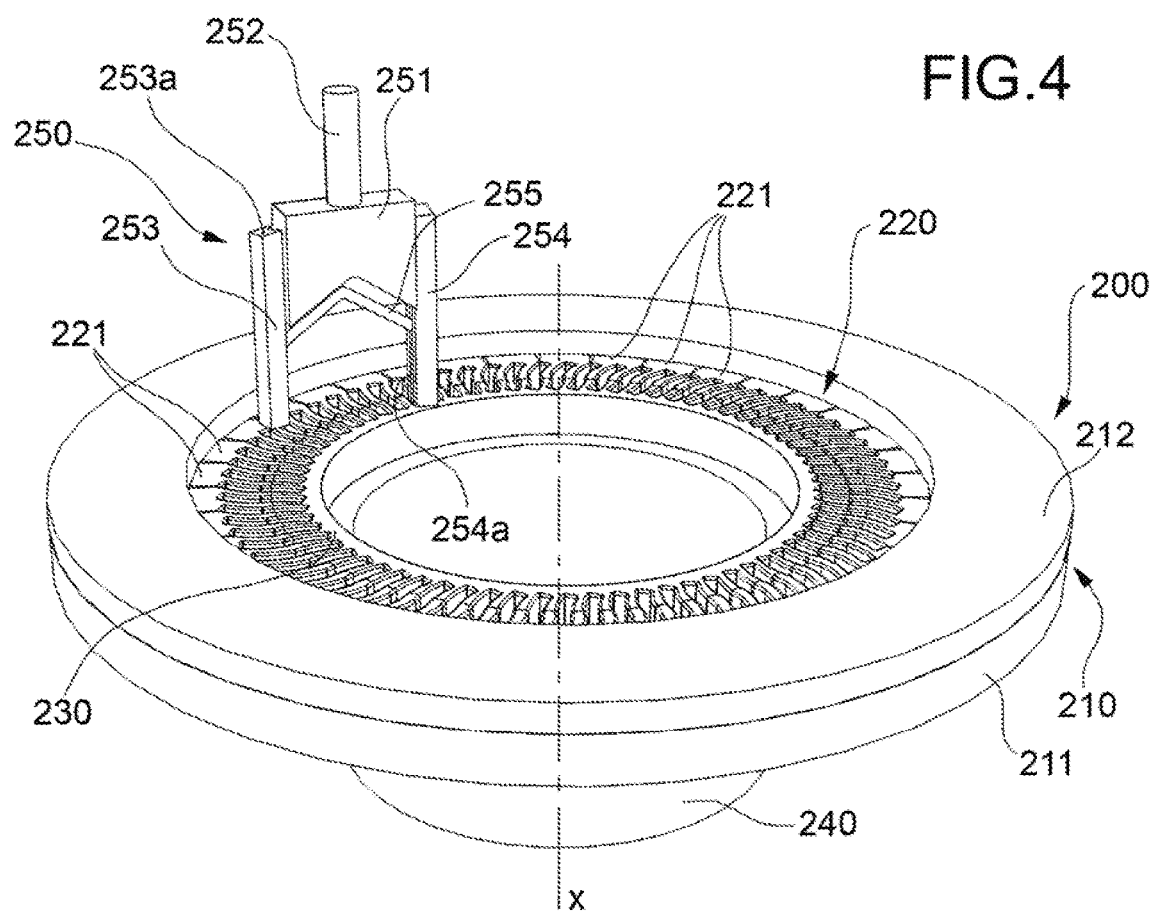
Figure 5:
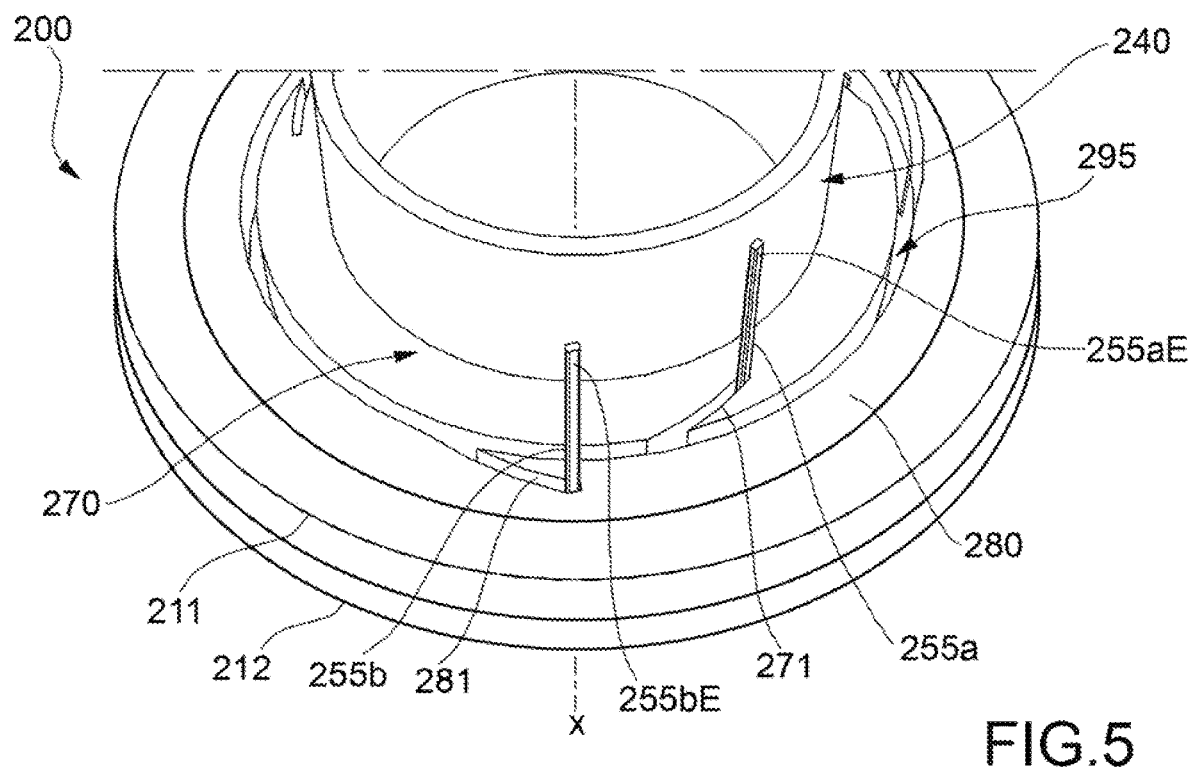
Figure 6:
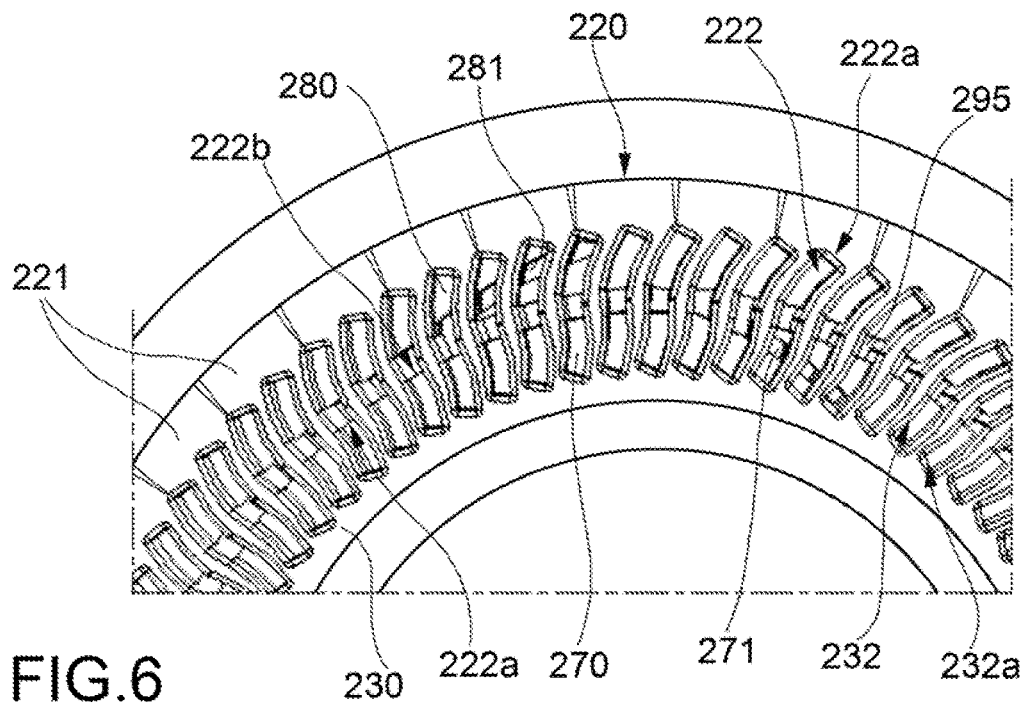
Figure 7:
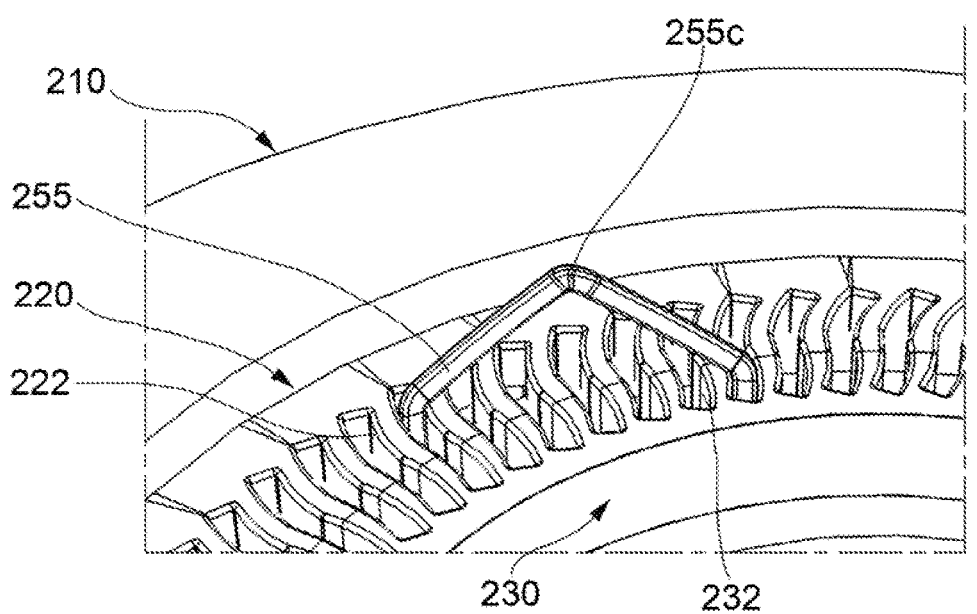
Figure 8:
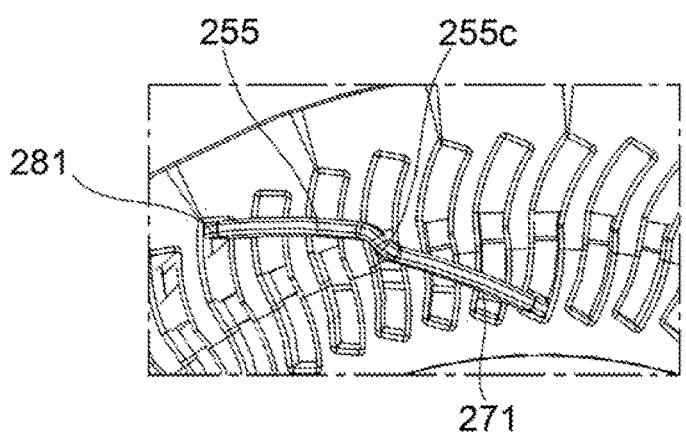
Figure 9:
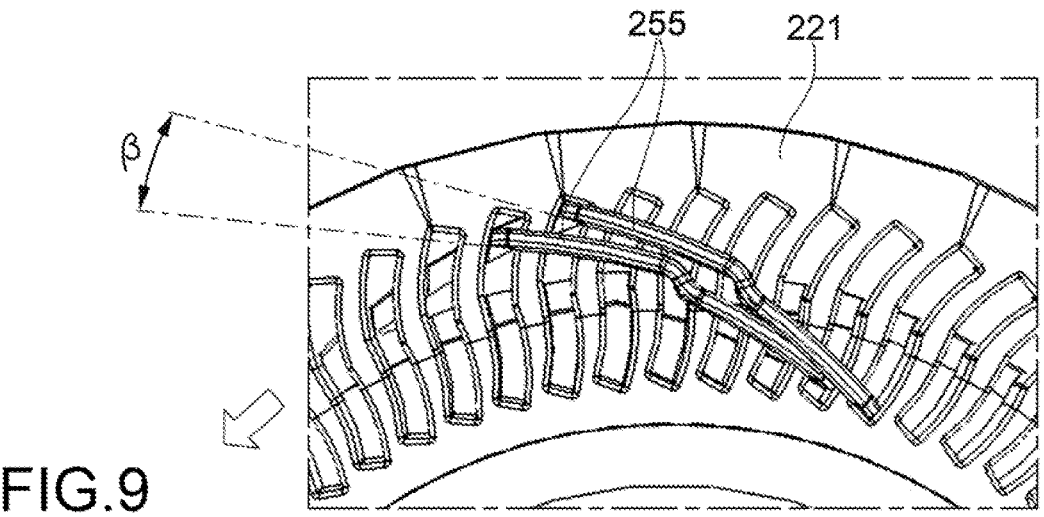
Figure 10:
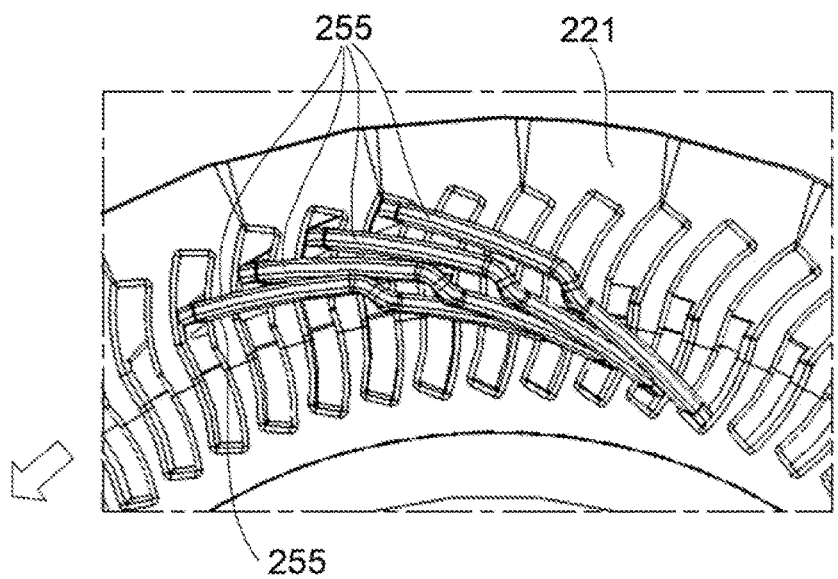
Figure 11:
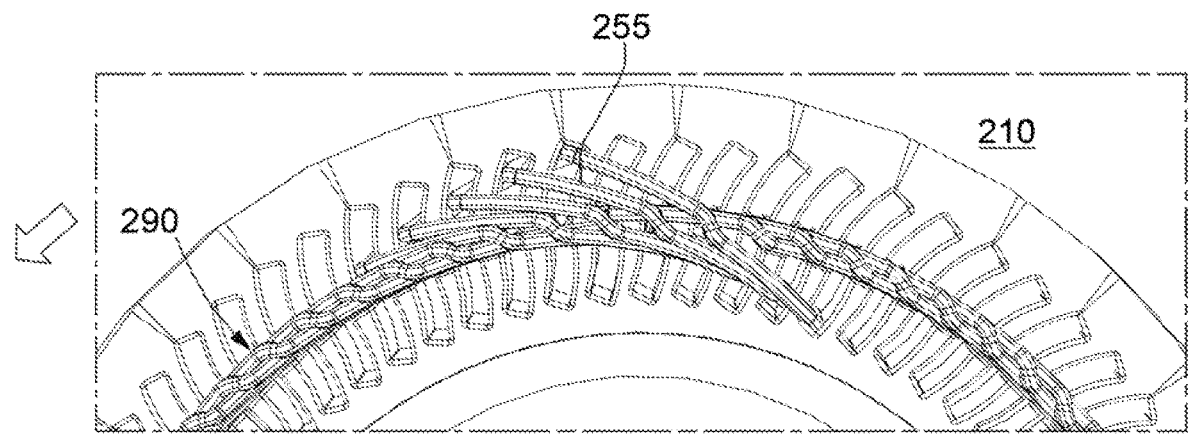
Figure 12:
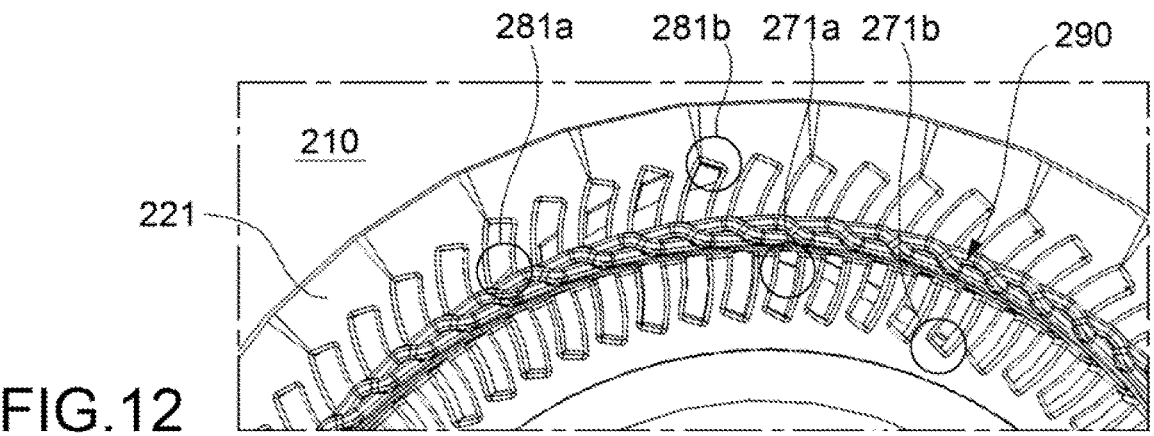
Figure 13:
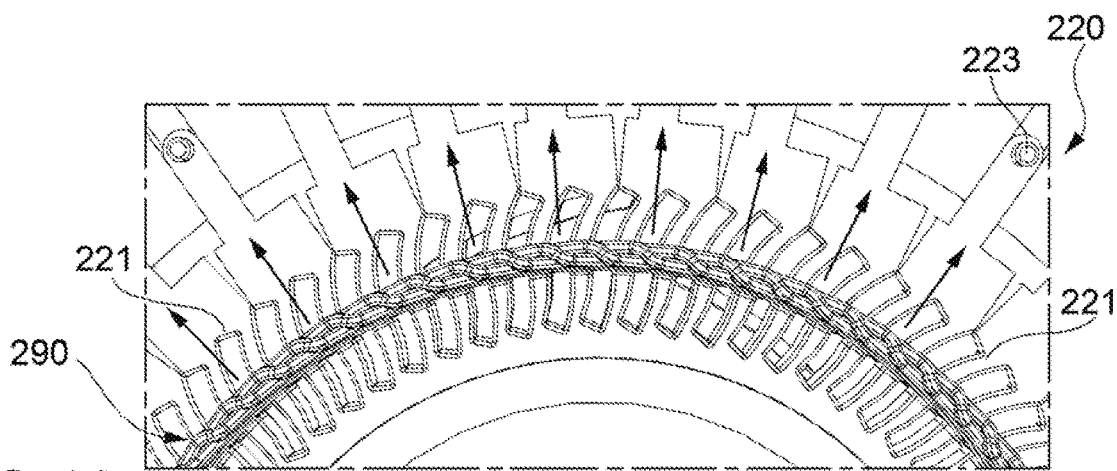
Figure 14:
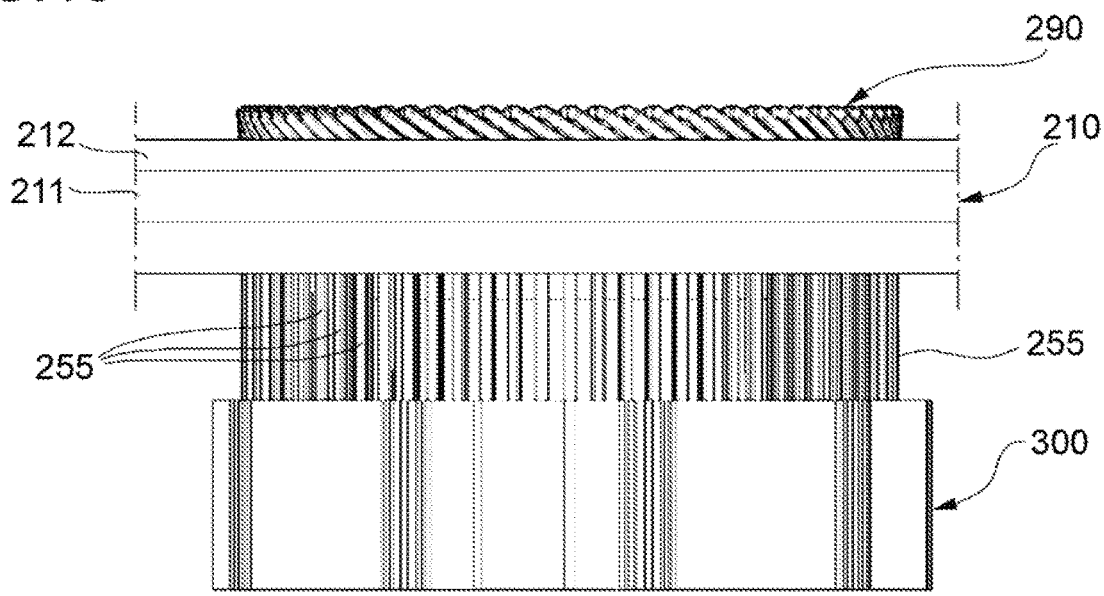
Figure 15:
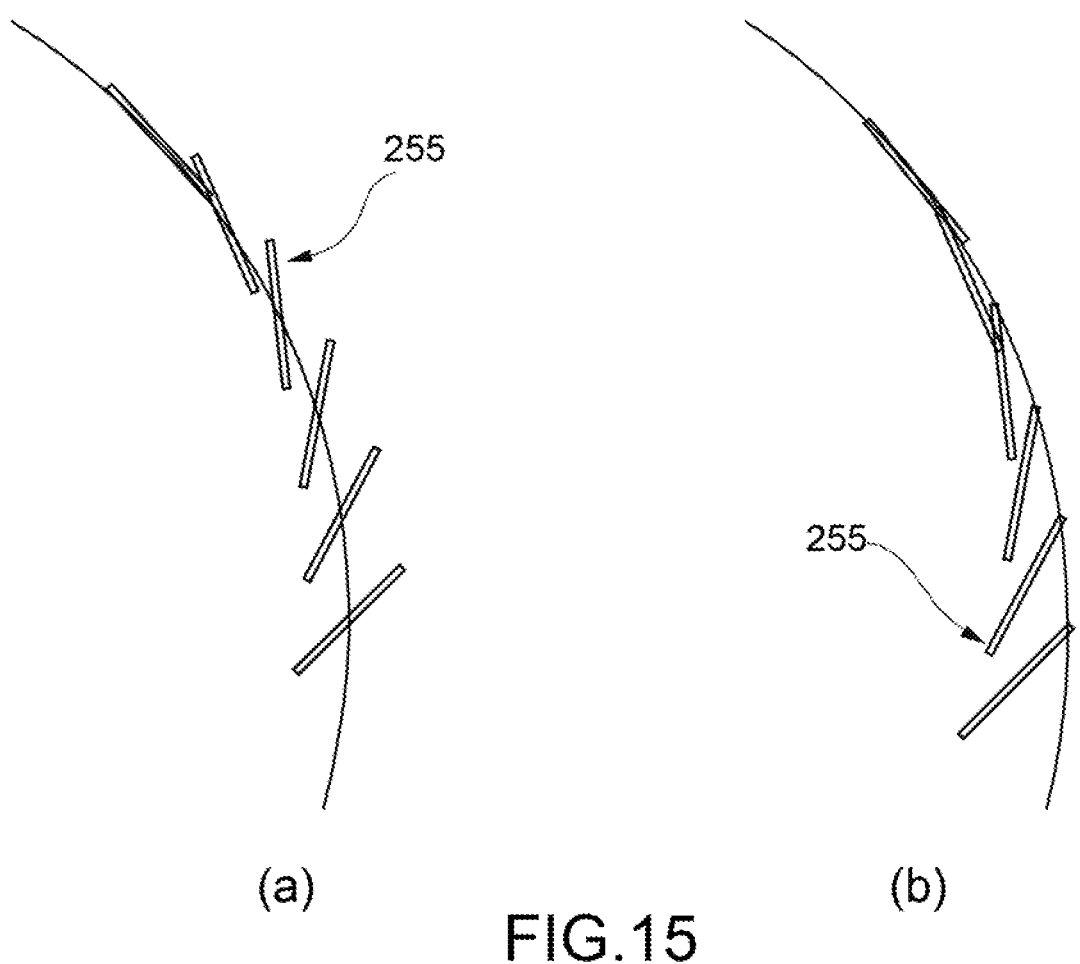
Figure 16:
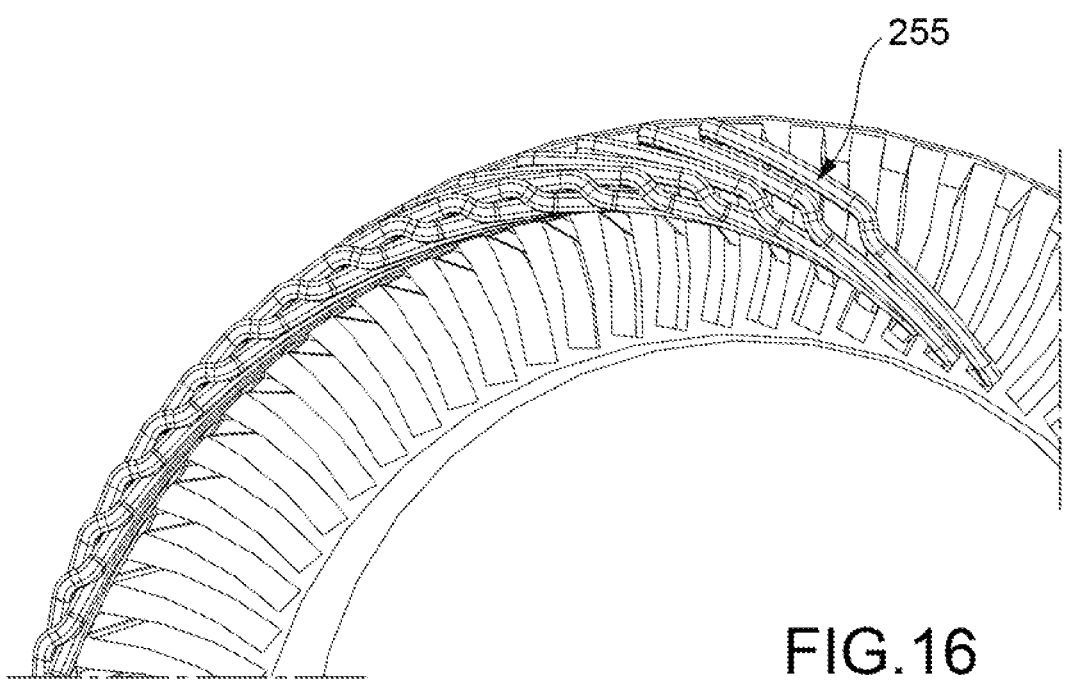
Figure 17A:
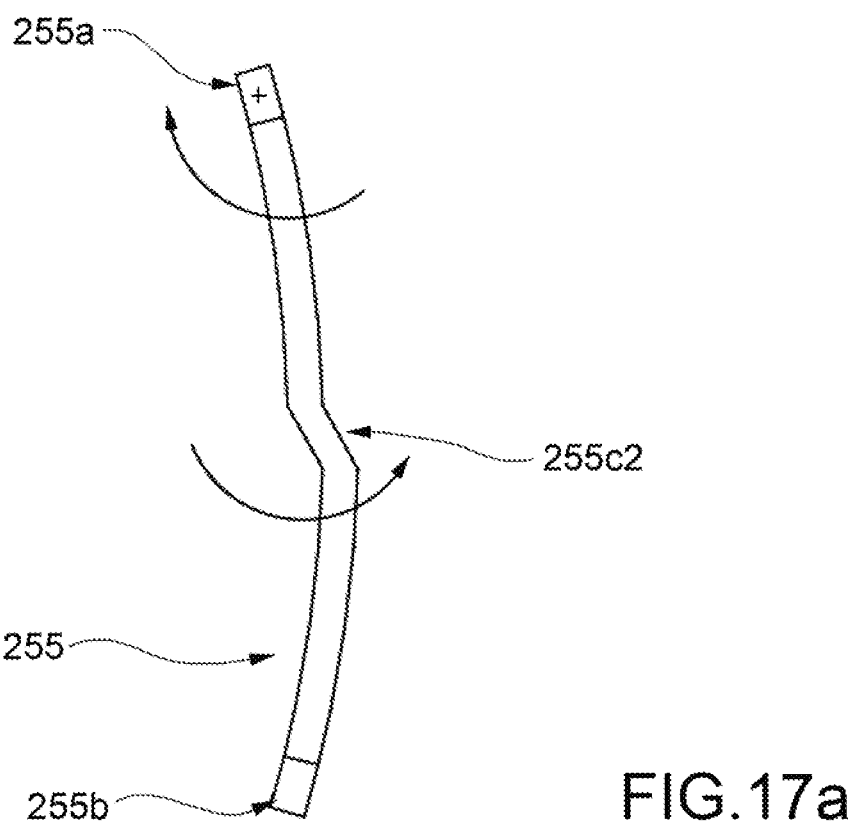
Figure 17B:
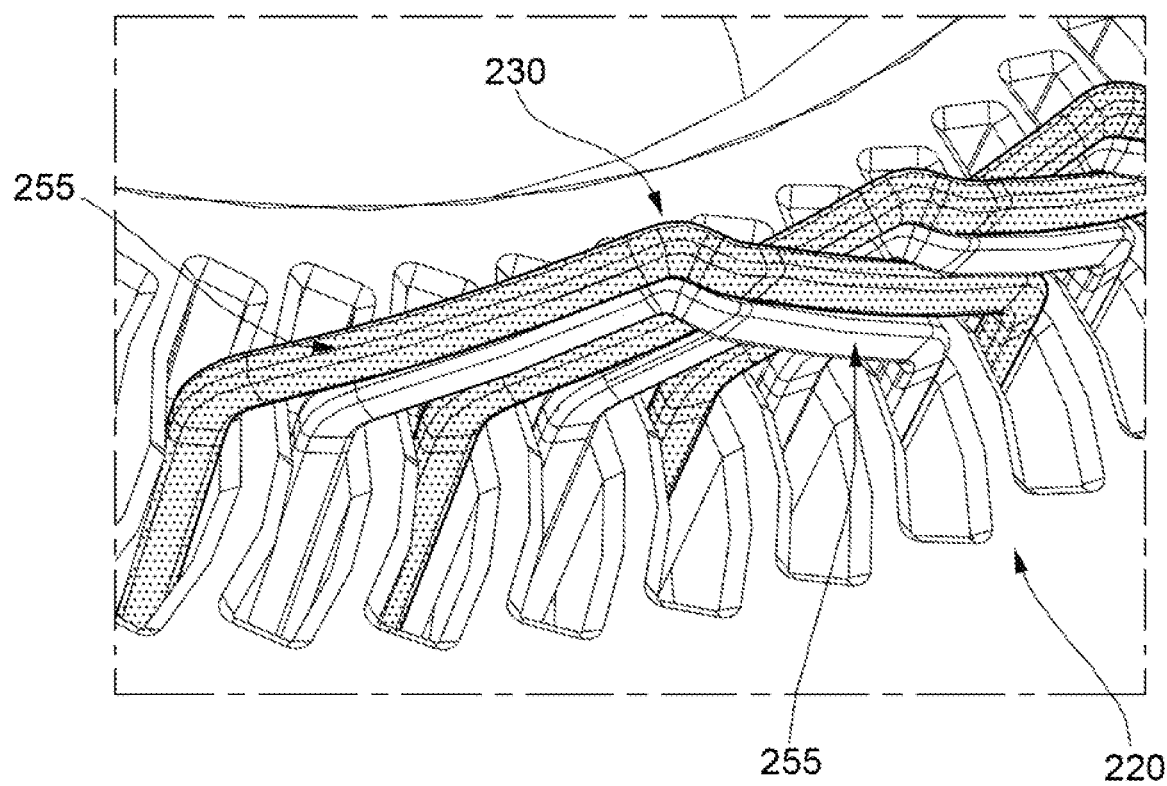
Figure 18:
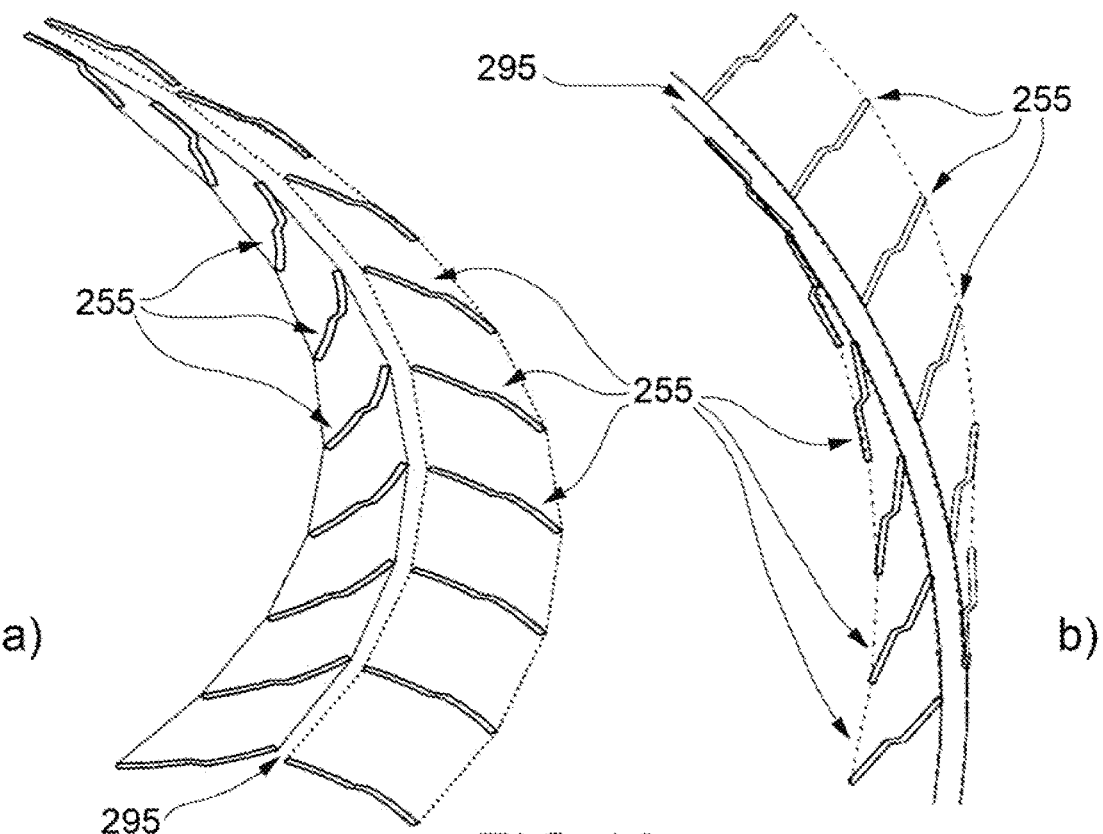
Figure 19:
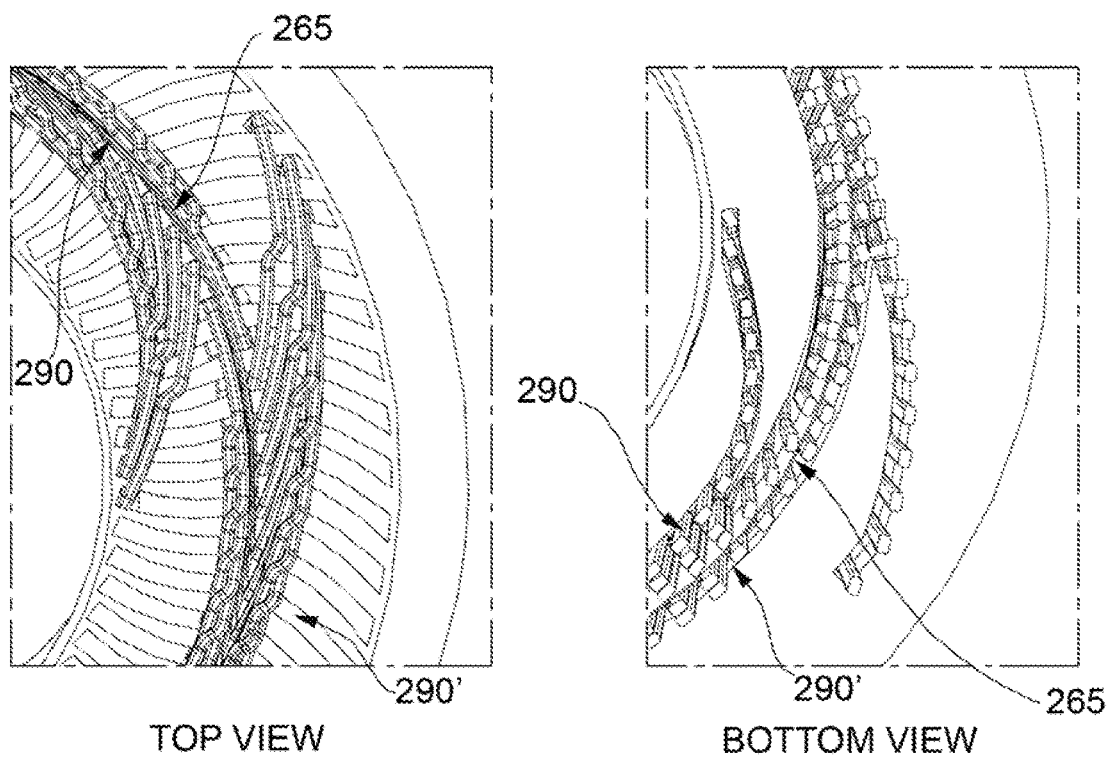
Figure 20:
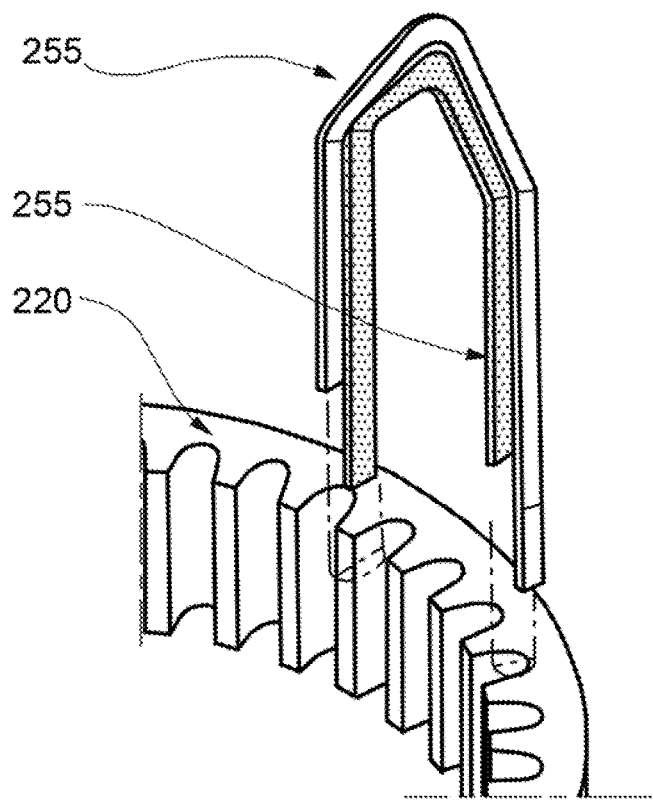
Figure 21:
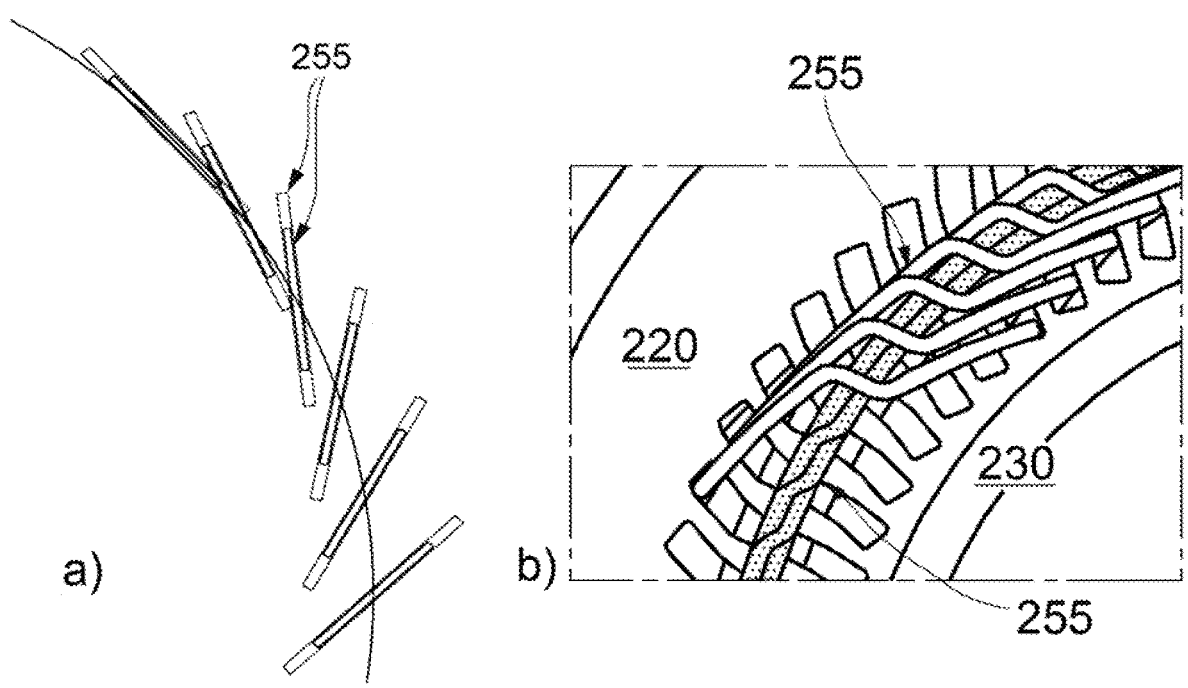
Figure 22:
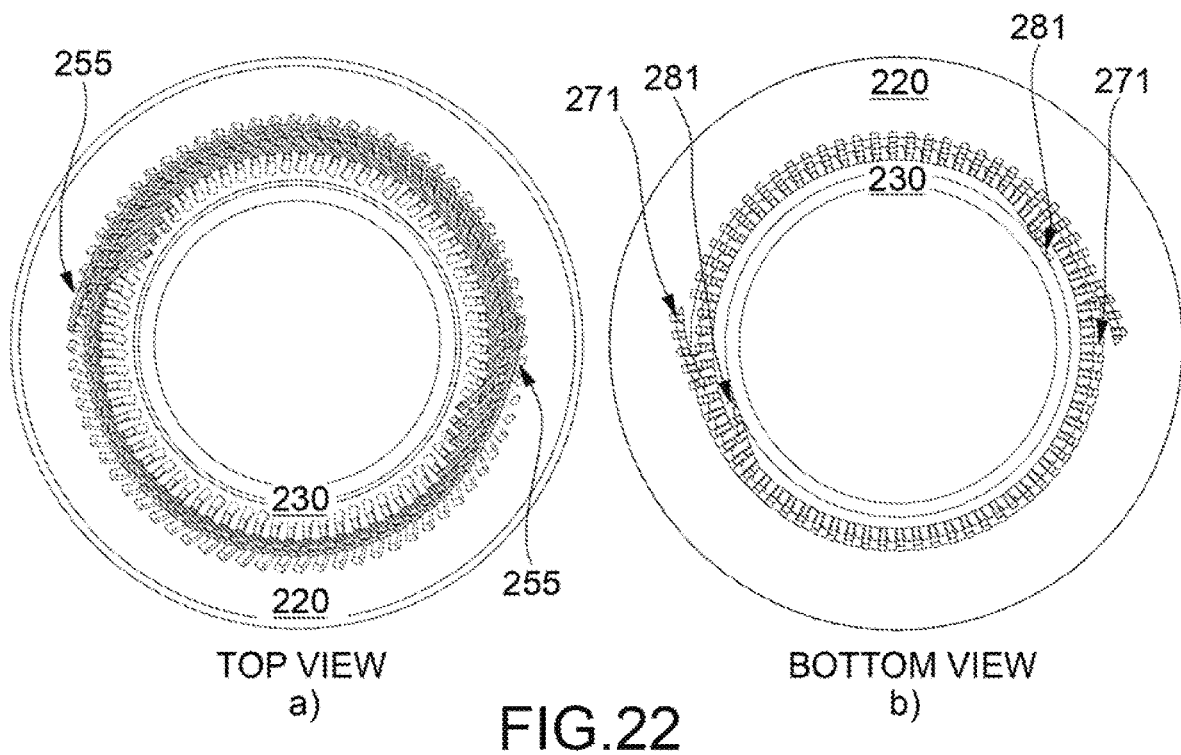
Figure 23:
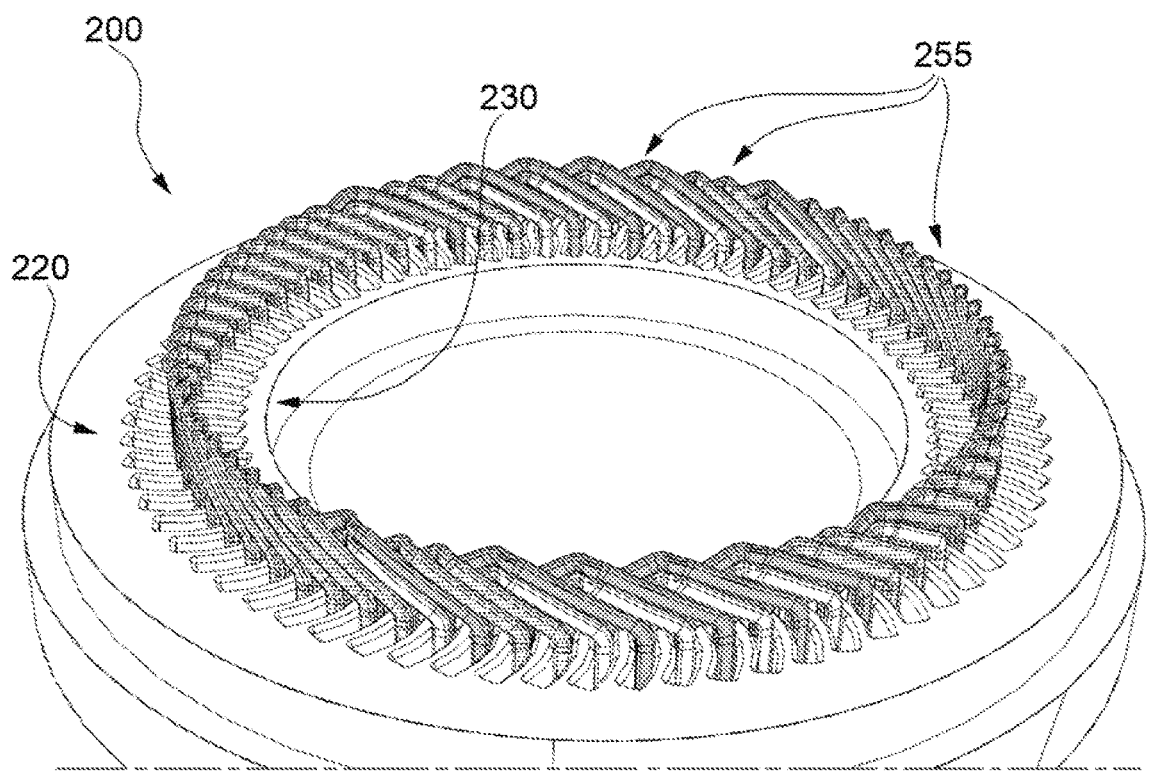
Figure 24:
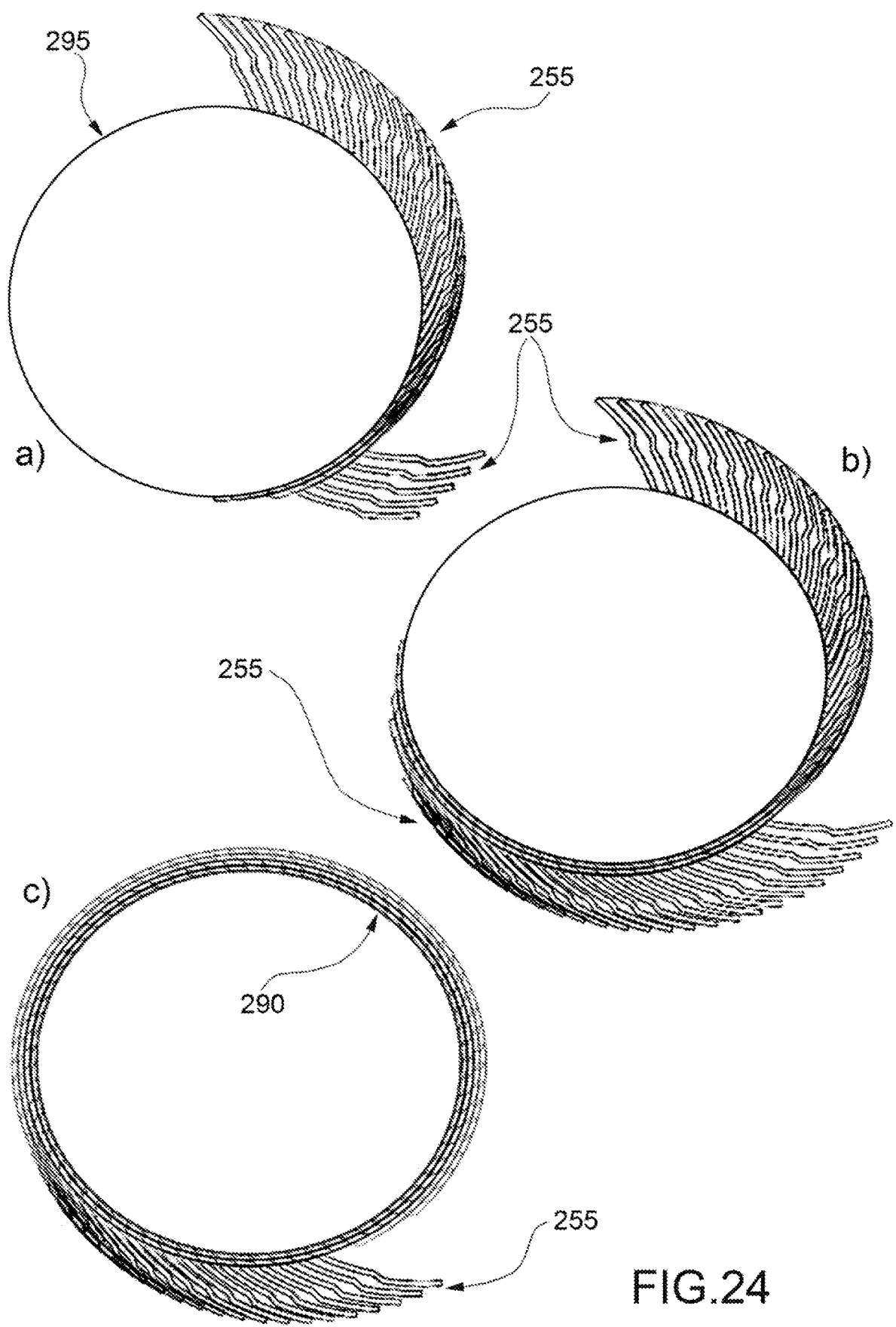
Figure 25:
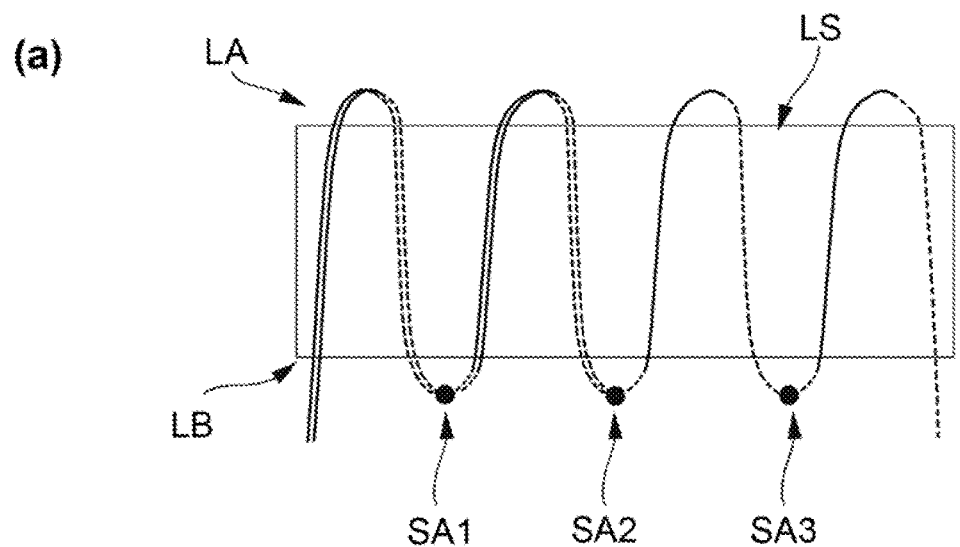
Figure 25:
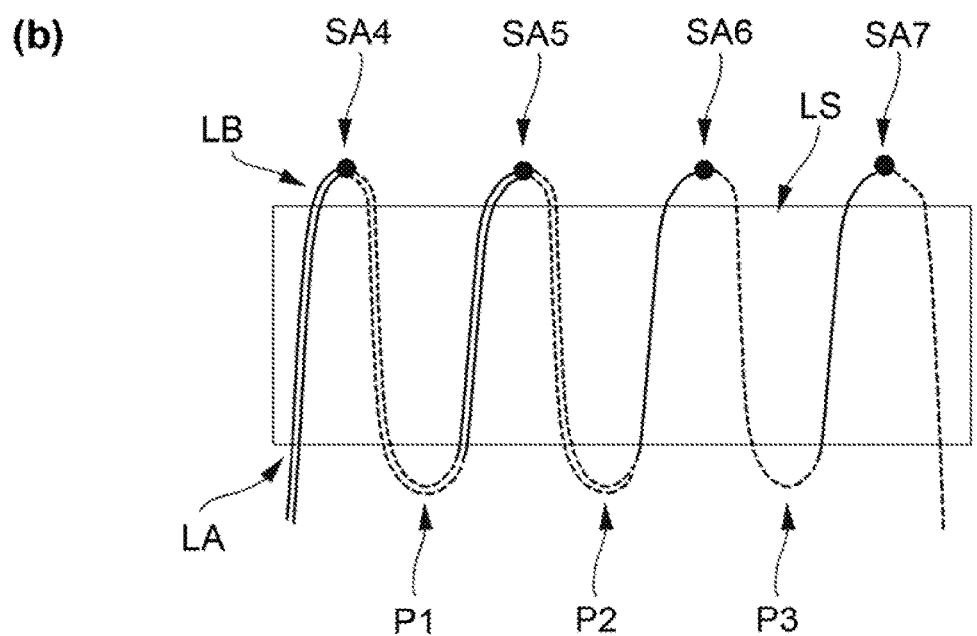
Figure 26:
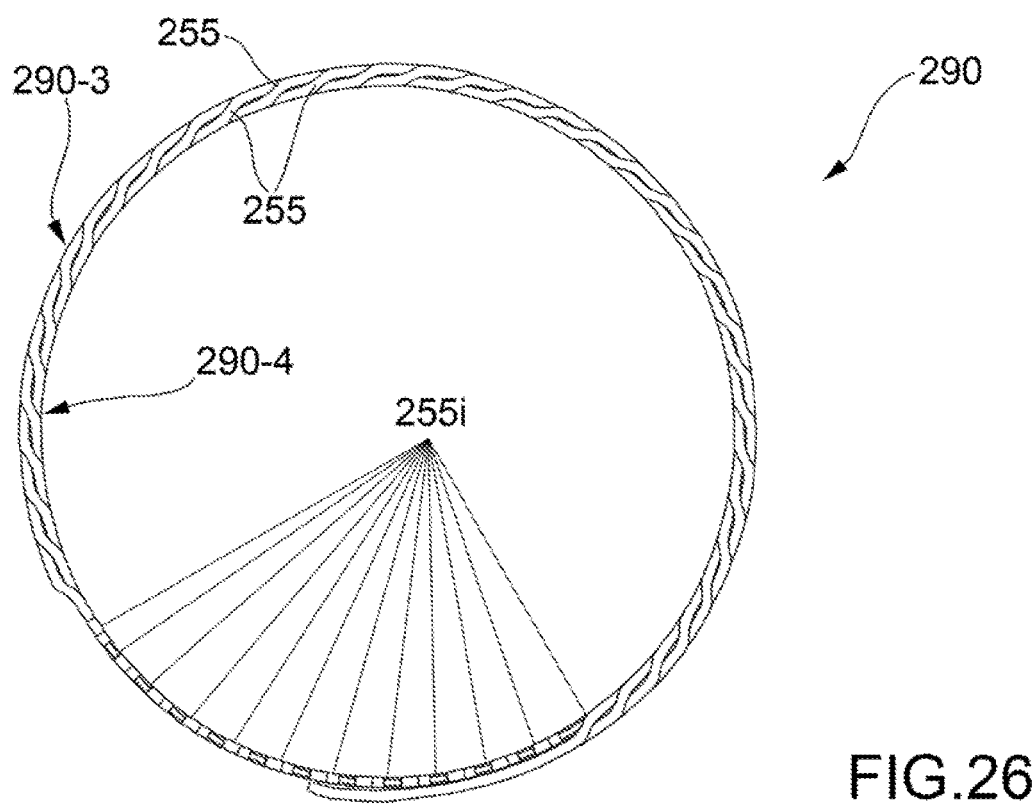
Figure 27:
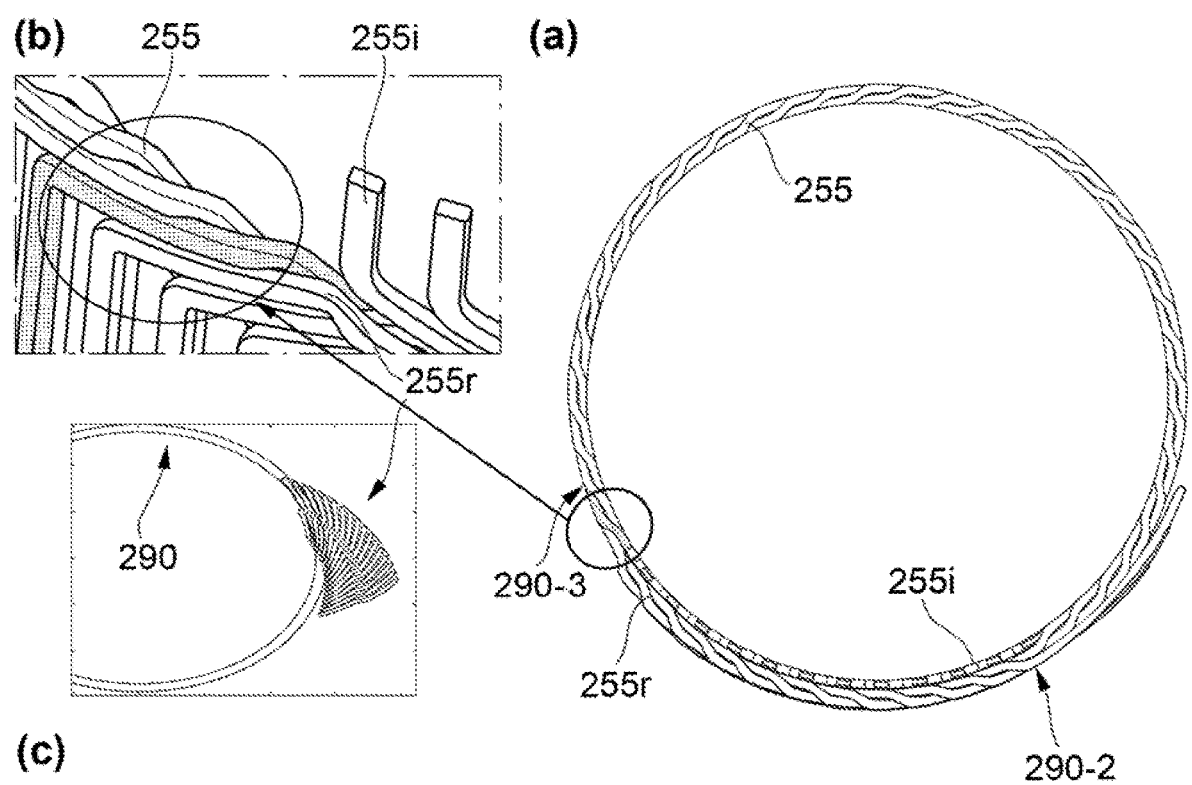
Figure 28:
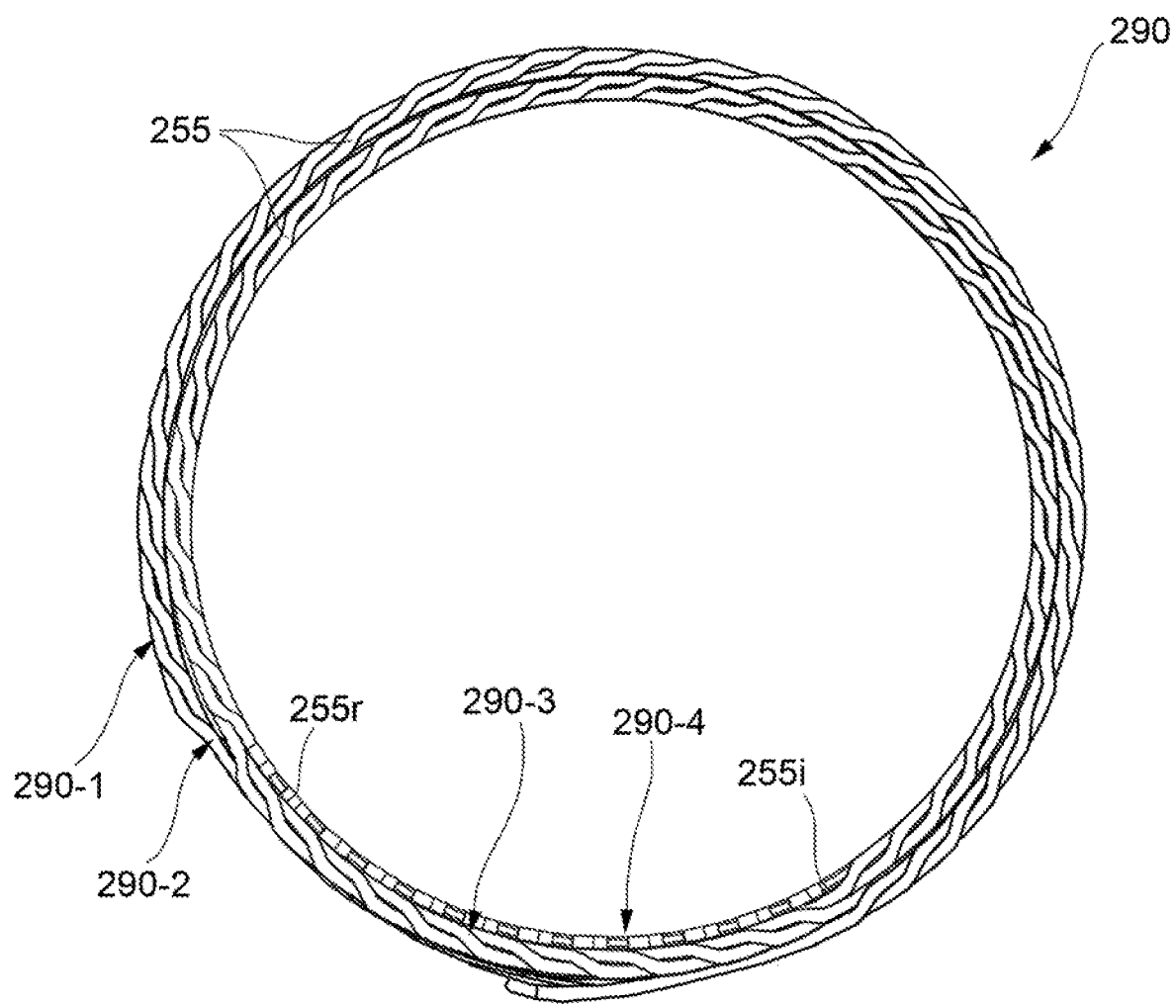
Figure 29:
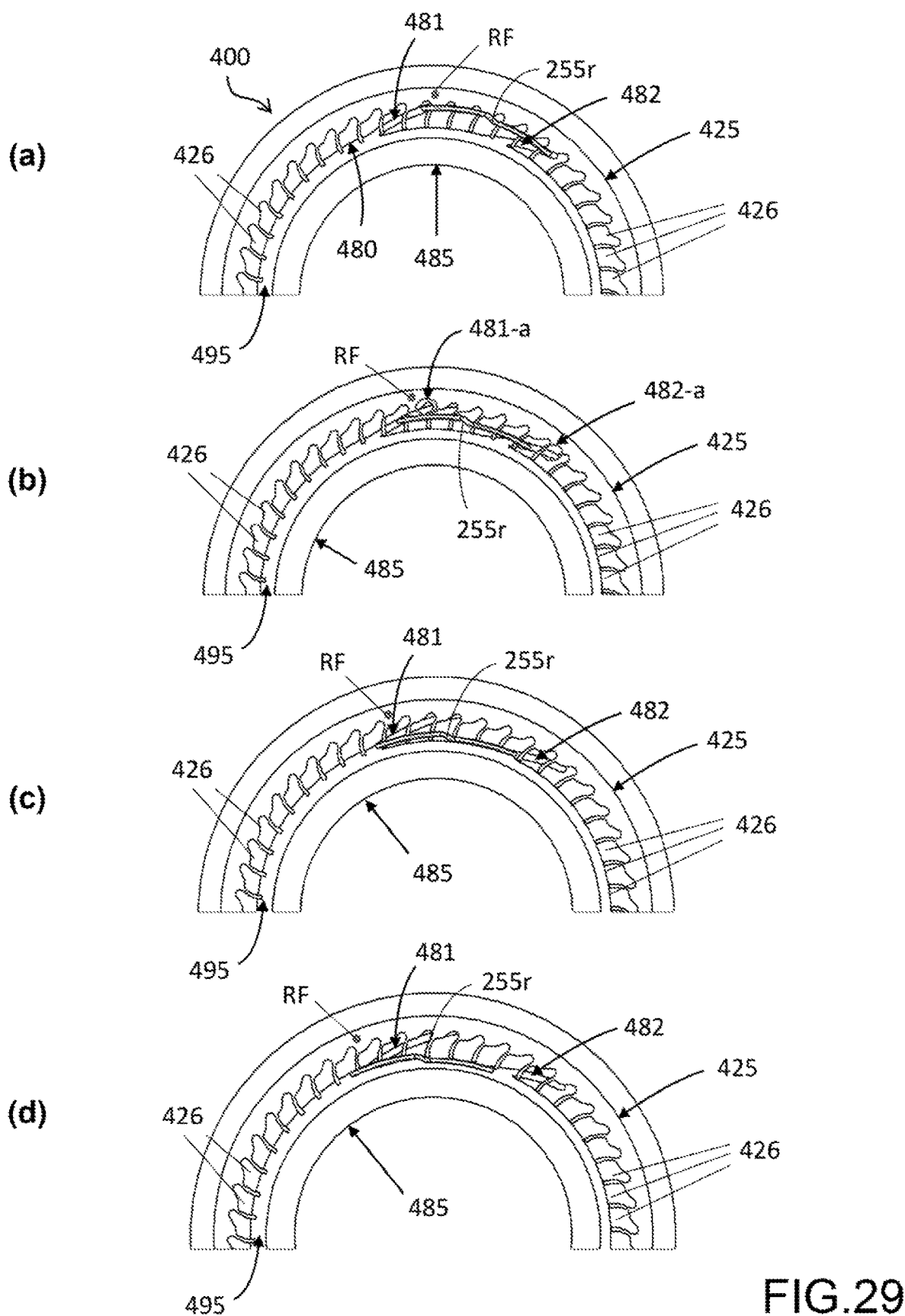
Figure 30:
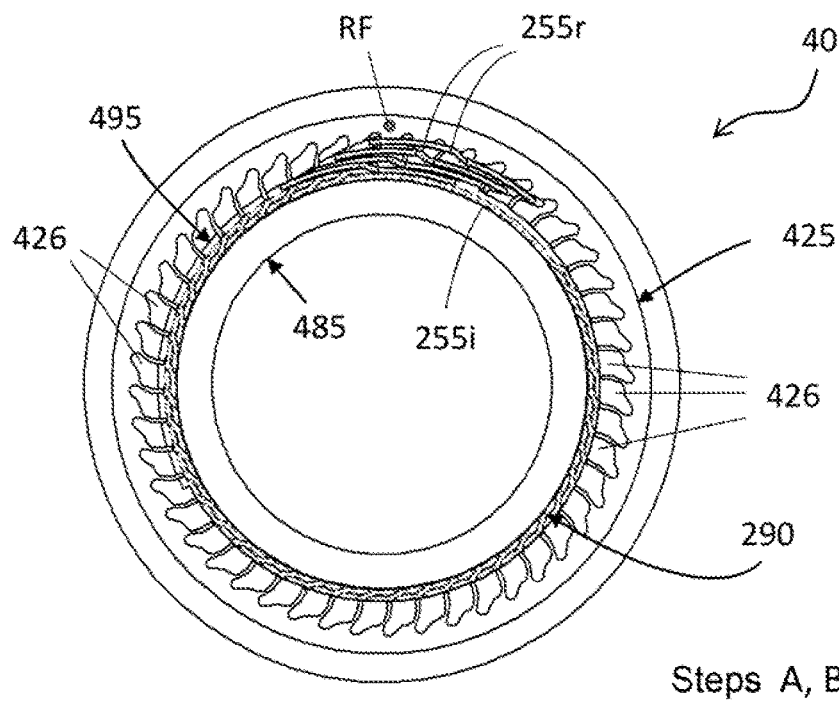
Figure 30:
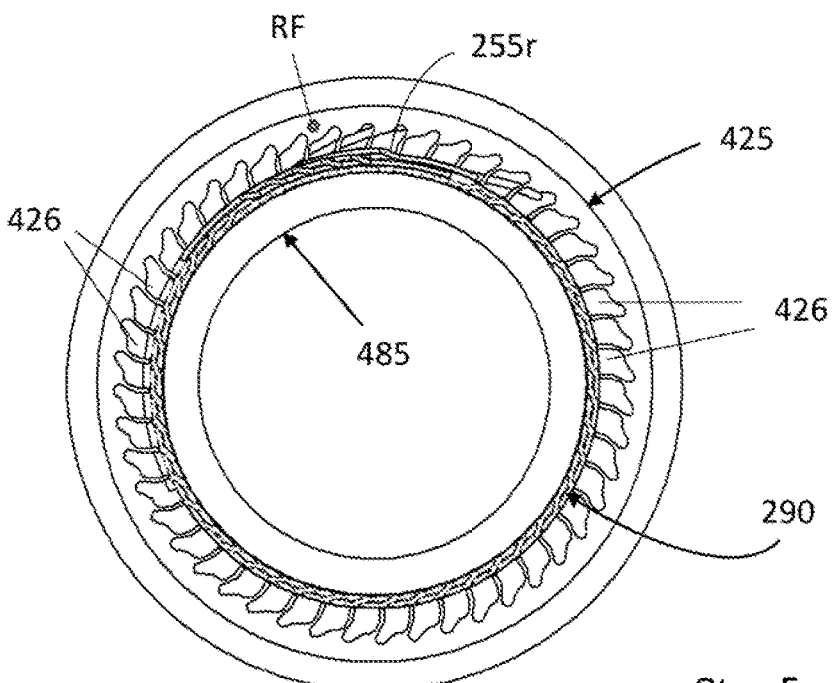

FIG. 3*a* shows a detail of use of a bushing of a pre-assembling apparatus of the prior art, according to an experiment by the inventors;

FIG. 3*b* shows in (a) a stamped conductor and in (b) the same conductor after being subjected to twisting on welding side;

FIG. 3*c* shows the hairpin of FIG. 3*b* from above, according to the prior art;

FIG. 3*d* shows in (a) a stranded hairpin with tipped cross section at the bending point and in (b) with continuous transposition along the hairpin portions housed in slot;

FIG. 3*e* shows in (a)-(c) three possible arrangements of the legs of the hairpin of a double crown winding in various positions in the slot; A and B indicate the crown to which the legs shown in slot belong (belonging to different hairpins);

FIG. 4 shows a diagrammatic perspective top view of an embodiment of the pre-assembling device of hairpin stator windings;

FIG. 5 shows a perspective view from below of the embodiment of FIG. 4;

FIG. 6 shows a partial top view of the inner and outer array of the device in FIGS. 4 and 5;

FIG. 7 shows a diagrammatic partial perspective view of the device in FIGS. 4-6, with a hairpin inserted;

FIG. 8 shows a partial top view of the portion in FIG. 7;

FIG. 9 shows the view in FIG. 8, in which two successive hairpins are inserted;

FIG. 10 shows the view in FIG. 8 or 9, in which four successive hairpins are inserted;

FIG. 11 shows the view in FIGS. 8-10, in which the last hairpins of the stator winding are also inserted;

FIG. 12 shows the view of FIGS. 8-11, in which the stator winding is complete and shows the entry points 271*b* and 281*b* of the two inner and outer cams and the exit points 271*a* and 281*a*, which may be closed at the end of the pre-assembly;

FIG. 13 shows the removal of the retractable inserts to free the winding; and FIG. 14 shows the insertion of the feet of the hairpins in the stator before the removal of the inserts;

FIG. 15 illustrate in (a) an envelope line formed by a median axis, and in (b) an envelope line formed by an axis positioned along a leg of the hairpin, with the respective rotations of the hairpin about the respective axis;

FIG. 16 shows the assembly of hairpins according to the present description, with rotation about a leg of the hairpin;

FIG. 17*a* shows a leftward hairpin (bent clockwise) with (1) the fulcrum on one of the two legs and in (2) the fulcrum on the other of the two legs; the rotation of the hairpin is in the opposite direction to that of the bend (counterclockwise rotation seen from above and with respect to a leg);

FIG. 17b shows the use of different hairpins (e.g. different spans) nested in the assembly of a single Crown, according to an aspect of the present description;

FIG. 18 shows two types of movement for assembling the double crown: the successive positions of the same hairpin (colored in for the inner crown, not colored in for the outer crown) at different instants of time are shown in (a): the hairpin is generally subject to a rototranslation with rotation with respect to one of its legs; for the hairpin of the inner crown, the rotation is counterclockwise, for the hairpin of the outer crown it is clockwise; a dashed line shows the curve which envelops the different positions of the leg in relative rotation of the hairpin (cam shape); a situation similar to (a) is shown in (b), with the difference that the hairpin of the outer crown is specular with respect to that of the same crown in the left figure and therefore rotates counterclockwise;

FIG. 19 shows the device according to the present description during the step of completion of the assembly of the double crown with the rotation of the last hairpins on one leg and counter-rotating arrays, as in FIG. 18 (b): (a) shows the top view in which the array or ring of slots can be seen, (b) shows the bottom view in which the cams can be seen; a separating partition is also shown between the crowns, which may be of a thickness such as to accommodate a previously assembled crown;

FIG. 20 shows the case of two crossed hairpins of different crowns, which forms an ABBA winding type, according to the prior art;

FIG. 21 shows an example of the movement for the assembly of the double crown, according to the present description, in which the positions of the same crossed double hairpin are shown in different instants of time; the double hairpin is generally subject to a rototranslation, with the rotation part which occurs with respect to the center of the hairpin;

FIG. 22 shows an example of configuration of the cams of the device according to the present description, for the rototranslation of the double hairpin in FIG. 21;

FIG. 23 shows an example of a winding crown assembled and ready to be inserted in the corresponding stator, constituted by three variants of hairpins: the first of standard pitch equal to 6 slots; the second of long pitch type equal to 7 slots; the third of short pitch type equal to 5 slots; and FIG. 24 shows a diagrammatic example of some steps of assembling in parallel of two crowns, according to an aspect of the present description, with two insertion points: (a) when the first hairpins of the inner crown are entered into the circular space, the legs not in rotation of the hairpin of the second crown may be approached, being the respective insertion points and cam envelope angularly offset with respect to those of the inner crown by an appropriate angle; (b) the assembly of the two crowns continues in parallel (simultaneously); (c) the completion of the assembly of the outer crown is temporally offset correspondingly to the angular distance of the insertion points of the two crowns;

FIG. 25 shows in (a) an interconnection diagram between layers of a 4-layer winding set, wherein hairpin with a single bending direction are used and in (b) an interconnection diagram between layers of a 4-layer winding set, in which hairpins of the reverse type are also used, with bending direction opposite to that of the other ones;

FIG. 26 shows a winding set obtained with the method according to the invention, wherein the second layer is not complete and the first layer includes a series of I-pins;

FIG. 27 shows in (a) the winding set in FIG. 25, in which a series of reverse hairpins has been added, in (b) a perspective detail of the winding set and in (c) the radial approaching movement of reverse hairpins according to the invention;

FIG. 28 shows the winding set in FIG. 27, in which a further series of hairpin (not reverse) has been added;

FIG. 29 shows in (a)-(d) the corresponding successive steps of an embodiment of the method according to the invention in a diagrammatic section of the apparatus according to an embodiment of the invention;

FIG. 30 shows in (a) a total top view of the apparatus in FIG. 29, with the insertion of reverse hairpins up to a given number, and (b) the same view but with the entering into the circular guide of the last inserted reverse hairpin;

Figure 31:
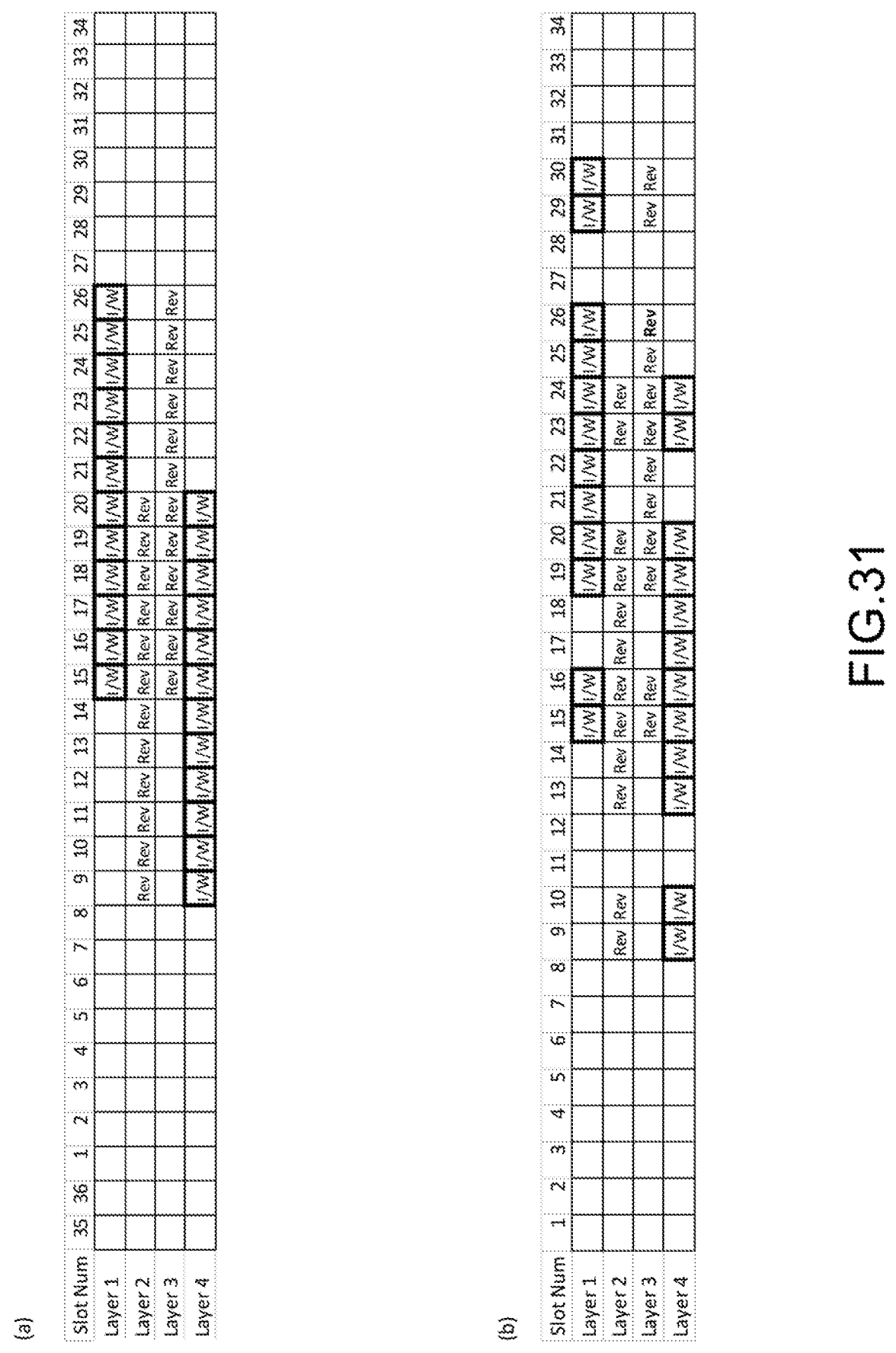

FIG. 31 shows in (a) an example of the position of the portions housed in slot of the reverse pin and/W-pin conductors as a function of the radial position (layer number) and of the angular position (slot number), in which one of the possible types of winding which can be made for a stator having 36 slots and 4 layers; the Rev boxes indicate the position (e.g. slot 9 layer 2) of the legs of all the reverse hairpins; the boxes I/W indicate the position (e.g. slot 9 layer 4) of the legs of all I/W-pins; in (b) the figure shows another example of the position of the portions housed in slot of the reverse pin and/W-pin conductors as a function of the radial position (layer number) and the angular position (slot number), in which one of the possible types of winding which can be made for a stator having 36 slots and 4 layers; the Rev boxes indicate the position (e.g. slot 9 layer 2) of the legs of all the reverse hairpins; the boxes I/W indicate the position (e.g. slot 9 layer 4) of the legs of all the I/W-pins.

It is worth noting that elements of different embodiments described hereinafter may be combined together to provide further embodiments without restrictions respecting the technical concept of the invention, as a person skilled in the art will effortlessly understand from that described and disclosed hereafter.

The present description also makes reference to the prior art for its implementation, with regard to the detail features which are not described, such as, for example, elements of minor importance usually used in the prior art in solutions of the same type.

When an element is introduced in the description or the claims, it is always understood that there may be "at least one" or "one or more", unless otherwise specified.

When a list of elements or features are listed in this description it is understood that the invention according to the present description "comprises" or alternatively "consists of" such elements.

Similar or equivalent elements in the accompanying figures are indicated by means of the same reference numerals.

For the purposes of the present description, "flat" or "square" bar conductor means a bar conductor having four substantially flat sides, each joined to adjacent sides and forming typically rounded edges. Therefore, the words "flat" or "square" or equivalent words used to describe the cross section of a bar conductor are used in a general sense and must not be interpreted to exclude the fact that such bar conductors have significantly rounded corners which join the substantially flat sides. The expression "flat conductor" means that the conductor has two opposite sides, the distance of which is greater than the distance between the other two opposite sides. For the purposes of the present description, the term "rectangular conductor" means a generalization of flat conductor and square conductor, being the square conductor a special case of rectangular conductor, in which the four sides have the same size.

For the purposes of the present description, the expression "non-circular conductor" or "non-circular hairpin conductor" or "non-circular hairpin" must be understood as designating a conductor having any polygonal shape section, and therefore as a generalization of "rectangular conductor". For example, conductors with a rectangular, triangular, pentagonal, hexagonal section, either regular or irregular, are included in this expression. Conductors with continuous closed curve sections, such as an ellipse, are encompassed as well. The bar conductors according to the present description may also be those having more unusual shapes, as described for example in the figures of patent application U.S. Pat. No. 7,622,843B2. Furthermore, the apparatus and method of the present description comprise the use of conductive bars in variously alternated manner, e.g. mainly of a type with some samples of one or more different types.

For the purposes of the present description, a slot can be defined both by a recess or a depression in a member which is completely surrounded by such member and by a cavity in a member in which one or more open sides of the cavity are adapted to be effectively closed by a surface or a wall of an adjacent component. In particular, a slot can also be a blind hole or a through hole in a member. In the case of a through hole in a block, an insertion face and an exiting face of the legs of a hairpin is defined.

For the purposes of the present description, the expressions "radial" or "circumferential" or other similar expressions defined with respect to a direction or an axis are to be referred to a circumference lying in a plane orthogonal to such direction or axis and which has the center on said direction or axis. Furthermore, for the purposes of the present description, the expression "angularly spaced" (or other similar expressions) as defined with respect to a direction or axis must be referred to the angle between two radii of a circle lying on a plane orthogonal to such direction or axis and which has the center on said direction or axis.

For the purposes of this description, a cylinder has a circular or approximately circular cross section, wherein the approximation may be due, for example, to manufacturing tolerances or to particular configurations of the stator or rotor winding which slightly differ from a circular shape, e.g. within a percentage of 15%, preferably within a percentage of 10% or 5%.

Again, for the purposes of the present description, a cylinder may also be understood as a prism with polygonal, either regular or irregular, section, with an approximation as that just described. Furthermore, a cylinder according to the present description may also have an elliptical or hyperbolic or parabolic directrix, and may in any case be oblique and/or variously truncated, according to the specific required industrial embodiments.

PREFERRED EMBODIMENT OF THE INVENTION

The present description relates to a device (or apparatus or assembly) and a method for pre-assembling a set of winding bars for stator or rotor, the winding set being constituted by, or comprising, hairpins (advantageously made of copper) with non-circular section, e.g. rectangular or square. Hereafter reference will be made indifferently to "hairpins" to mean "hairpin conductors" or "basic conductors". "Basic conductor" means a preformed hairpin or a hairpin in its final shape (hairpin with non-bent legs on the welding side), as described below. Furthermore, the present description also relates to the simultaneous pre-assembling of two or more winding, concentric and, in some embodiments, adjacent sets.

Referring to FIGS. 4-13, in an embodiment of the present description, a device 200 is provided for pre-assembling a stator or rotor winding starting from hairpin 255 having non-circular section or "basic conductors" as defined above.

The device 200 may optionally comprise an outer containment ring 210 (more in general, a containment device or containment means, e.g. acting on the peripheral surface of the ring 220, 230 which connects the first insertion face and the second exiting face) with rotational symmetry axis X, advantageously with a bottom layer 211 of the outer containment ring and an upper layer 212 of the outer containment ring, where "upper" and "lower" mean successive positions along axis X, in particular towards the ground when axis X is oriented substantially with the force of gravity.

Inside and substantially adjacent to the outer containment ring 210, (at least) one outer array (or "ring") 220 is arranged either comprising or connected to handling mechanisms (not shown) of retractable inserts 221, which constitute parts of the array itself. The outer ring or array 220 may be ring-shaped with a circular section (about a central axis X), and may have a peripheral surface advantageously substantially perpendicular to said circular section. The peripheral surface is advantageously on the outer periphery of the circular section, and also advantageously combines two opposite surfaces of the ring, preferably substantially flat. Housings for accommodating of the retractable inserts may be provided along the inner perimeter of the circular section (closest to the center of the circumference).

The retractable insert 221 can be made in a single block. The retractable insert 221 may advantageously comprise a slot 222 (Cf. FIG. 6), which preferably has a shape corresponding to an S-shaped portion in which the closed end 222a is conveniently squared and the width of the S is substantially constant. This allows having a fixed abutment for the hairpin. It is also possible to provide a closed end with a margin due to rounding, if a chamfer in height (not shown) which guides the leg of the hairpin is desired. The slots 222 may also be different from one another, to insert also hairpins of pitch/span/throw different from that of the remaining majority of the hairpins. In general, slots 222 or even 232 may define a respective opening along a depth direction substantially parallel to said central axis X and along a radial direction with respect to said central axis X. Each slot may be configured to receive along said depth direction at least one free end 255aE, 255bE of one or more basic conductors 255 (i.e. an end not connected in bridge-like manner to the other leg).

With specific reference to FIG. 13, the retractable insert 221 is advantageously provided with a pawl 223, for the radial handling of the same retractable insert 221, which will be better described below with reference to the pre-assembling method of a winding set according to the present description.

Other devices or containment means can be used instead of the containment ring 210, e.g. integral with the slots, or even formed in a single piece with the slots, as in the case in which the slots are openings closed on each side with respect to direction X.

Preferably, an inner array 230 is arranged, in an operative position, in a concentric manner and radially adjacent to the outer array 220. It may be ring-shaped with a peripheral surface which combines two opposite surfaces, advantageously substantially flat, as in the case of the outer array 220. The inner array 230 is preferably made in one piece and displays a radial plurality of inner array open slots 232, which have a shape corresponding to an S-shaped portion in which the closed end is conveniently squared and the width of the S is substantially constant. Other embodiments are however possible, in connection with the chamfer mentioned above. As in the case of the outer array 220, each open slot may be different from the other, for the same reasons.

According to an aspect of the present description, also or only the inner array may comprise retractable inserts (not shown), operating as described above, with the difference that the radial opening movement is towards axis X and not away from it as for the outer array.

According to an aspect of the present description, the inner ring or array 230 and outer ring or array 220 are configured to rotate either integrally or in counter-rotation. In any case, the rotations in the present description may always be understood as relative rotations of one element with respect to another.

With reference to the view in FIG. 6, the outer array slots 222 and the inner array slots 232 thus form, when they are adjacent with respect to the respective open ends 222b and 232b, a closed slot or closed slit on the plane of the arrays and "S"-shaped. This S-shape is not essential; however, it is advantageous because it makes it possible to reduce the width of the closed slit when the hairpin rotates with respect to a central axis (parallel to the legs and mediate between them). When instead the hairpin rotates with respect to an axis coincident with one of its legs, the optimum shape (without clearance of the hairpin inside) of the slot is reduced to an arc of circumference. Every other sub-optimum shape is also envisaged, according to a different aspect of the present description.

Advantageously, the outer array (or ring) 220 and the inner array (or ring) 230 are mechanically supported on a fixed system or on adequate supports for a self-supporting device (not shown) also by means of containment blocks of the type of said containment block 210.

According to the present description, the slots may be made without splitting them into two (mutually) opposite slots 222 and 232. The slots may have a shape different from the "S"-shape and be obtained in one single piece or in more than two pieces.

The assembly of the containment ring 210, of the outer array 220 and of the inner array 230 may be connected to a supporting hub 240, as described in more detail hereinafter (Cf. FIG. 5).

Furthermore, preferably, the aforesaid handling mechanisms of the retractable inserts are placed on a common support (not shown). According to an aspect of the invention, the slot array may be adjacent in axial direction to the cam block. According to an aspect of the present description, one or more pairs of slot arrays may be used, between which the cams are interposed (sandwiched in axial direction). The slots aligned, in axial direction (the one above and one below the cam in the axial direction), of one the two arrays (outer or inner) may be formed in the same retractable insert.

FIG. 4 further shows an insertion instrument 250 of hairpins 255 (having circular, square or any other section). Such insertion instrument 250 advantageously has a first vertical rod 253 and a second vertical rod 254, respectively and preferably having a first sliding guide 253a and a second sliding guide 254a, advantageously as recesses in the first 253 and second 254 vertical rod. With such an insertion instrument, one leg of the hairpin 255 is positioned in the first sliding guide 253a and the other leg of the hairpin is positioned in the second sliding guide 254a. A suitably shaped pushing piece or blade 251 is made to slide between the two vertical rods 253, 254 and pushes the hairpin 255 to insert its two legs 255a, 255b inside two slots 222 and 232 described above (in particular, the ends of the "S"). The push may be conveniently provided by virtue of a handle 252 connected to the pushing piece 251. The illustrated and described shape of the insertion instrument is not the only one possible, being only an example of means configured for inserting the hairpins 255 in view of the pre-assembling of the winding set. For example, it is possible to provide an automatic picker which uses tool 250 or another tool to insert each hairpin 255.

FIG. 7 shows an example of hairpin 255 inserted in the apparatus 200 according to the invention in a perspective view from the top.

FIG. 5 instead shows an example of hairpin inserted in the apparatus 200 according to the invention in a perspective view from below. The insertion ends (ends of the legs) 255aE and 255bE of the hairpin can be seen. According to an example of the present description, these legs do not meet an abutment. For this reason, the legs 255a and 255b may have a different length, contrary to what occurs in the prior art. From the electric functional point of view, this means that the bar conductors with a different length on the same layer can be managed by virtue of the system of the present description. For the purposes of the present description, special conductors, in contrast to basic conductors, means bar conductors which are used to complete a winding. Such special conductors, in intrinsically known manner, include for example, jumpers, phase terminals, star point conductors needed to connect two or more ends which face the same side of the stator.

FIGS. 5 and 6 additionally show an engagement mechanism of the legs 255a, 255b of the hairpin 255. Under (or over) the inner array 220 and outer array 230 (from the side of one of the two opposed flat surfaces of the inner and outer arrays 220, 230, advantageously the side in which the hub 240 extends having a rotational symmetry axis X) an inner cam block 270, which has an inner cam, and an outer cam block 280, having an outer cam, are respectively positioned. The outer block 280 advantageously surrounds and radially faces the inner block 270.

To make the inner cam, an inner envelope guide 271 (preferably with a through cut) is advantageously made on the inner cam block 270 and configured so as to form an envelope of the various positions of a leg 255a or 255b of the hairpin 255 during the pre-assembling of the present description. Indeed, referring to FIG. 12, the inner envelope guide 271 starts from an exiting point 271a of the inner cam on the surface which faces the outer cam block 280, and advantageously extends into the inner cam block 270 in a spiral for a stretch towards the hub 240 (in radial direction towards the axis X; the hub is visible in FIGS. 4 and 5).

To make the outer cam, on the outer cam block 280 an outer envelope guide 281 (preferably with a through cut) is advantageously made, configured so as to form an envelope of the leg 255b or 255a of the hairpin 255 in the same rotation direction of the inner envelope guide 271. Indeed, the outer envelope guide 281 starts from an exiting point of the outer cam 281a on the surface which faces the inner cam block 270, and extends in a spiral in the outer cam block 280 for a stretch towards the outer containment ring 210.

According to an aspect of the present description, the cam block may also be in one piece or in more than two pieces, either arranged in concentric manner or not.

The envelope guides 271, 281 constitute the cams of the cam blocks either as a whole or in part. The shape of the cam(s) depends at least on the position of the rotation center of the conductor, the position of the cam itself and the geometry of the hairpin.

According to an aspect of the present description, the outer envelope guide 281 is configured to take, upon relative rotation of the ring 220, 230, the leg 255*b*, 255*a* of one or more hairpins 255 inserted into it from the outside towards said free circular space 295, shown in FIGS. 5-14. Either alternatively or additionally, the inner envelope guide 271 is configured to take, upon relative rotation of the at least one ring 220, 230, the leg 255*b*, 255*a* of one or more hairpins 255 inserted into it towards said free circular space 295.

The apparatus may be configured so that the insertion points 271*b* and 281*b* are positioned, each time, at each rotation pitch, detailed in the following description, at the closed ends 222*a*, 232*a* of the "S" (i.e. of the slots in the radial direction on the plane of the array, i.e. slot bottom).

There may also be multiple different envelope guides for each cam block, since hairpins also with different spans can be assembled. The rotation axis of the hairpin may be any one of the axes parallel to the legs of the hairpin. Only one cam (single block with an empty central space 295 and only one envelope guide), rather than two, can be sufficient to assemble the single crown. In this case, the hairpin turns about one of two legs, and one of the two points of insertion of the hairpin, corresponding to the two legs, is already in the position in which the leg itself will be at the end of the assembly procedure. FIG. 15(*b*) shows an intuitive representation of the movement of the hairpin as seen from the axis of the winding crown. For the sake of clarity, FIG. 15(*a*) shows the movement of the hairpin induced by the two concentric cams described above. The exiting points 271*a* and 281*a* (see FIG. 12) can be closed (meaning that the corresponding leg of the hairpin 255 can no longer enter), and their closure may be achieved in many manners, e.g. with closing pieces, counter-rotating discs (not shown, inserted from below the arrays (exiting side of the legs of the hairpin or "welding side"), in the direction of the axis X), to prevent the leg of the last hairpin inserted in the method (described below) from locking in the exiting point.

Figure 2:
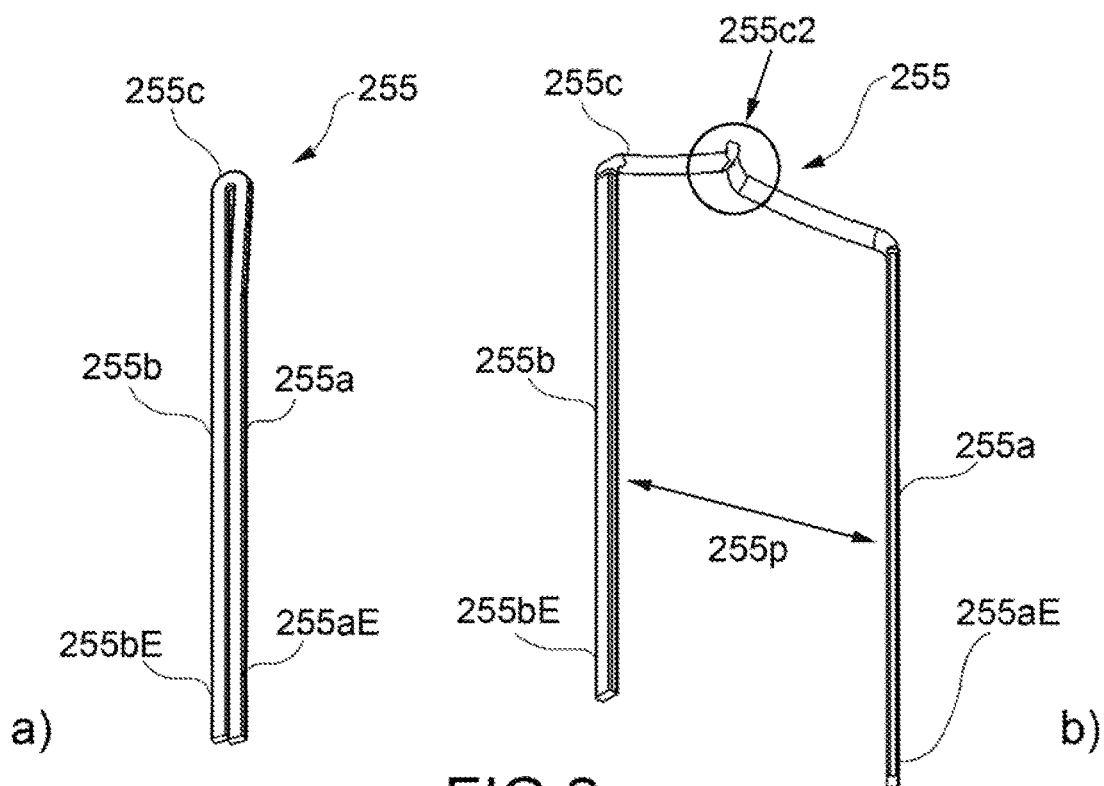
FIG. 2 shows in (a) a flattened "U" preformed hairpin, and in (b) a finished hairpin, according to the prior art.

A free distance (free circular central space 295) is maintained between the inner cam block 270 and the outer cam block 280, determined so that two or more consecutively inserted hairpins 255 do not interfere. The linear distance between the ends of the guides (exiting points 271*a* and 281*a*) corresponds to the distance 255*p* between the two legs of the hairpin, see FIG. 2.

Of course, according to an aspect of the present invention, when a single insertion guide is present, there is a single exiting point, as described above.

In the device 200 according to the present description, preferably, the closed S-shaped slots 222,232 mentioned above are moved all together according to the method described below. On the contrary, the inner 270 and outer 280 cam blocks preferentially remain fixed. The opposite is also possible, although it is much more complicated, because the positioning of the insertion instrument 250 of the hairpin must change position, and therefore there would be two circular movements instead of only one (the cam blocks 270, 280 and the tool 250 must be moved). According to an aspect of the present description, the slot arrays can rotate either integrally or in opposite directions with respect to the cams.

The cam blocks 270, 280 and the arrays 220, 230 will provide the path that the hairpin 255 must follow for its movement. Indeed, the relative movement between cam blocks and arrays constrains the hairpin(s) to follow a predetermined movement.

Referring to FIG. 19, according to an aspect of the present description, the pre-assembling apparatus may comprise a removable partition 265 to be inserted in the median line inside the free circular space 295 so as to be gripped between the two crowns of the winding set 290 being formed. The thickness of the separating partition 265 between the crowns may be such as to accommodate a previously assembled crown.

The winding method according to the present description will now be described referring specifically to FIGS. from 8 to 13. The process comprises the following steps:

1. Positioning the arrays with respect to the respective cams in appropriate manner to open the insertion point of the cam envelopes at the crossing by the respective leg of the hairpin 255, possibly removing the obstruction of a tooth of the array of slots (this applies to the insertion of the basic conductors, of I-pins and W-pins alike);
2. Inserting a hairpin 255 onto the array: its legs 255*a* and 255*b* inserted respectively in sliding guides 253*a*, 254*a* are pushed by the insertion blade 251, into the array 220, 230 (FIG. 4);
3. Rotating (by means, not shown, external to the device described hereto), advantageously of a slot pitch or a multiple thereof, of the array: after the insertion of the first pitch, rotating the array by one slot pitch; the legs 255*a* and 255*b* guided by cam blocks 270, 280 rotate and are arranged in a position progressively closer to the final position, the final position being the position which they will have (with both legs) in the pre-assembled winding assembly 290 (Cf. FIG. 12);
4. Inserting the last hairpin 255 (preferably of the same type) and successive extra-rotation (not shown): the last inserted hairpin 255 may require an additional rotation to complete the movement and to exit from the path of the inner and outer cam blocks 270, 280, which can be determined as a function of the size of hairpins and device in the specific application cases.
5. Inserting the successive hairpins 255 of one same type: steps 1 and 3 are repeated in iterative manner, i.e. almost all the hairpins 255 are inserted, whereby completing the winding set or "hairpin crown" 290;
6. Repeating steps from 1 to 5 (preferably for the different types of hairpins having different pitch/span/throw possibly used), to be inserted in the insertion points of the respective cam envelopes; and
7. A further step may consist in rotating the ring by a predefined angle, in order to make the last basic conductor 255 or the last I-pin or the last W-pin which was inserted exit from the at least one envelope guide 271, 281; and
8. Repeating steps from 1 to 6 for the different crowns (winding sets) of which the winding of the stator/rotor is composed. The assembly may take place simultaneously on multiple crowns, or the insertion of the hairpins of a crown may be started after the partial assembly of other crowns of the same winding. Furthermore, a predetermined number of basic conductors may be used all having a different predetermined distance, predefined angular opening between the legs. The rotation of step 3, by virtue of the conformation of the cam blocks 270, 280, causes:

for each rotation pitch or multiple thereof, each hairpin 255 rotates substantially on itself with respect to its rotation axis, which can be positioned on one of the legs in a median or intermediate position between them or on the apex (central point 255c2 in the element in FIG. 3c) of the hairpin; and for each rotation pitch or multiple thereof, each hairpin 255 translates so as to free the insertion space of the successive hairpin 255.

It is not necessary for the hairpin to be inserted at a later stage to go into the adjacent or previous slot in the rotation direction of the array; hairpins can be inserted also at a distance of more slots, if a leg of the hairpin is not already in the free circular space in the starting position.

As regards the position of the rotation axis, reference is made to FIG. 15, which shows in (a) an envelope line formed by a median axis, and in (b) an envelope line formed by an axis positioned along a leg of the hairpin, with the respective rotations of the hairpin about the respective axis.

In steps from 2 to 4, the hairpin 255 is supported by arrays 220, 230 (e.g. by means of the bridge-like part 255c through the slots). Alternatively, the hairpin 255 may be supported by a lower contrast element (not shown). The ring 220, 230 may be configured to move and/or space out the basic conductors in addition to supporting them.

According to an aspect of the present description, steps 1 and 2 are performed with respect to inner block 270 and outer block 280 described above, and where in step 3 the inner ring 220 and the outer ring 230 are both rotated in counter-rotation or only one of the two is rotated, or the two rings rotate in the same direction.

The steps described above can also be repeated by changing the type of hairpin, e.g. using a hairpin in which the angular opening of the legs with respect to a predetermined axis parallel to the legs themselves is different from the angular opening of the previously used hairpin. In the same manner, as many sets of homogeneous hairpins as desired can be introduced. It is preferable and not always compulsory to use hairpins with smaller angular distance before the hairpin with greater angular distance. This is mandatory only if the short ones and the long ones are nested, i.e. if the axial insertion of one is prevented by the presence of the other. In the succession of actions to be performed to assemble a winding, a wide hairpin must mandatorily be inserted after inserting the narrow hairpin on which it is crossed in the assembled winding configuration. The inclusion of the two hairpins in concern may not be simultaneous. Respecting said constraints, any one of the hairpins, of either standard pitch or different pitch, may be inserted indifferently either before or after another hairpin.

At the end of step 6, the crown of hairpins 290 is formed, but is still inserted in the device 200. It is now possible to proceed in various manners for the application onto the stator or rotor core. Referring to FIG. 14, the following mutually successive steps (not shown) are preferably performed:

8. Closing exiting ducts 271a, 271b on the cam blocks 270, 280, to prevent the displacement of the hairpins which are found at the openings 271a, 271b on the cam blocks; and
9. Inserting the crown of hairpins 290 into the stator core 300.

During step 8 here above, a contrast in the form of a fixed ring or integral with the array of slots may be used, which prevents the radial movement of the legs of the formed circular crown.

Once the ends of the hairpins 255 of the crown or winding set 290 are inserted in the stator or rotor core 300, or prior to this step, the array equipped with retractable outer or inner elements 230 can be moved away to free the hairpin crown 290. This may advantageously occur, according to an aspect of the present description, with sectors or inserts 221 which are retractable radially outwards (away from the axis X) by virtue of pawls 223 (tappets of outer cam block 280, which is used for the radial extraction), as shown in FIG. 13.

Otherwise, a gripper can be used to extract the hairpin crown 290 and then place it in the stator or rotor core 300.

According to an aspect of the present description, the pre-assembling device can be configured for pre-assembling two or more concentric layers simultaneously. For such purpose, it is possible to define the rotation type of the hairpins of two crowns, also in relation to the rotations of slot array and cam block.

FIG. 17a shows a rotation mode of the hairpins, depending on the direction of the central bend of the hairpin. In detail, FIG. 17a shows a leftward hairpin (bent in counterclockwise direction, lower arrow on bend level) with the fulcrum on one of the two legs; the rotation of the hairpin in the opposite direction to that of bending (clockwise rotation higher arrow). The same considerations apply in the case of hairpins with central bend in the opposite direction, such as those of FIGS. 15 and 16. It is also possible to have rightward bending directions, simply by reversing the direction of the central arrow in FIG. 17a. In practice, the bridge of the U which constitutes the hairpin is not comprised on a plane or on a surface with a single center of curvature. Starting from one of the two legs, there is a first portion, then a central portion which creates an angle of discontinuity with the first portion, and then a second portion with a new angle of discontinuity. It is as if a U were taken with bridge along a curve with single center of curvature and the central portion of the bridge were twisted leftwards or rightwards when viewed from the top and fixing a reference point (one of the legs).

Referring to FIG. 17b, the device and method according to the invention allow in one aspect the use of different hairpins (e.g. different span) nested in the assembly of a single ring. In particular, in said figure, it is possible to observe two concentric hairpins of radial width equal to one layer and span/pitch/throw equal to 5 and 7 slots, respectively, having homologous legs on the same layer.

Referring now to FIG. 18, the configurability of the position of the rotation axis of the hairpin relative to the hairpin itself, makes it possible to assemble the two winding crowns. Two cams, one for each ring, are necessary in this case. If the outermost (inner) leg of the hairpin (in the finished winding) acts as the rotation center, the cam which actuates is inside (outside) the crown being formed. The cam must induce the rotation of the hairpin in the direction opposite to that of the bend of the U-shaped portion as seen by an observer placed on the leg-fulcrum of the hairpin, i.e. the leg on which the center of rotation of the hairpin is located. FIG. 18 shows a movement for the assembly of the double crown, showing the positions of the hairpin itself (colored for the inner crown, in full contour for the outer crown) in different instants of time.

The hairpin is generally subject to a rototranslation.

In the case shown in FIG. 18(a), the rotation occurs with respect to one of its legs, being counterclockwise for the inner hairpin, clockwise for the outer hairpin, for an observer placed on the leg which acts as rotation center. A dashed line shows the curve that envelops the different positions of the leg in relative rotation of the hairpin (cam shape or envelope guide). The inner and outer slot arrays rotate rigidly with respect to the cams to induce such a movement.

In the case shown in FIG. 18(b), with respect to FIG. 18(a) the hairpin of the outer crown changes and in this case is specular with respect to that of the same crown in the picture on the left and envisages the anticlockwise rotation of the hairpin for an observer on the leg which acts as a center of rotation. The inner and outer slot arrays rotate in opposite directions with respect to the cams to induce such a movement. FIG. 18(a) or (b) shows two circular line arcs which both represent the empty central space referred to above, but are drawn at a distance for greater clarity.

FIG. 19 shows the two crowns 290, 290' assembled at the same time towards the end of their assembly. It is worth also noting the presence, absolutely optional according to the present description, of a separating partition between the crowns, which may have a thickness such as to accommodate one or more previously assembled crowns whereby forming a sandwich of at least three crowns (not shown).

With reference to FIGS. 20-22, a double crown with hairpins nested in order to assemble an ABAB or ABBA type winding may be obtained with the apparatus according to the present description. In this case, the double crown may be obtained also with a movement with respect to a median axis between the two legs of the hairpin, as apparent from FIG. 21.

In order to assemble an ABBA type winding, two pairs of cam envelopes can be arranged in different angular positions with respect to the symmetry axis X and with different sizes of the envelope guides, as shown in FIG. 23. The size of the one of the center guides is relative to the thickness of a pair of legs of the hairpin with longer legs and the size of the other is relative to the cumulative thickness of the two pairs of legs of the two crossed hairpins. The two hairpins in the final crown are crossed on each other as seen from one side of the stator as shown in FIG. 21(b) in the case of flush hairpin legs (the two pairs of legs can also be non-flush, i.e. not ending on the same line), whereby obtaining an additional advantage with respect to the prior art.

More in general, according to an aspect of the present description, one of the two legs is closer than the other with respect to the central axis X or to the circular space 295, and wherein said at least one envelope guide 271, 281 is configured and shaped so that, for at least one group of basic conductors 255, said legs of the basic conductors are taken into said free circular space 295 according to a movement of said basic conductors 255 towards said free space 290 of at least the legs furthest from the central axis X, wherein the basic conductors have equal angular width between the legs with respect to the central axis X, with equal movement path for each of the homologous legs which compose it, from the point of view of an observer integral with said at least one winding assembly 290 being formed inside said circular space 295.

FIG. 22 shows the case in which both the inner block and the outer block have two envelope guides and thus two insertion points. In general, each block can have any number of envelope guides.

FIG. 23 shows, both from slots array side in (a) and from cam side in (b), according to an aspect of the present description, an embodiment in which again there is the pre-assembly of a double crown, and in which both the outer block and the inner block of the cam block have two envelope guides mutually placed at 180°. The hairpins can be individual or nested. An advantage of this arrangement is to complete the windings with greater rapidity.

Moreover, according to an aspect of the present description not shown in the figures, in order to pre-assemble hairpins of different pitch and with legs of different lengths as shown in FIG. 20, in the apparatus according to the invention there may be present a first cam block, which extends radially with respect to the central axis X at a first height on said central axis X and which comprises a first series of envelope guides and a first free circular space 295 having a first radial dimension, and a second cam block, which extends radially with respect to the central axis X at a second height on said central axis X and which comprises a second series of envelope guides and a second free circular space 295 having a second radial dimension, wherein the first height is different from the second height, and the first radial dimension is different from the second radial dimension, and wherein said first cam block and said second cam block are configured to rotate, in use, in simultaneous and synchronized manner or remain fixed. This makes it possible to drive each hairpin differently. The two guides at different heights may also be constructed in a single block. Moreover, the number of elements in said first and said second series of envelope guides can mutually be in a 1 to 2 ratio, and the same applies to the first and the second radial dimension therebetween. This option derives from the consideration that the guides for inner hairpins of an inner crown of nested crowns are located on both cam blocks, i.e. the one above and one below, otherwise the insertion and then the rotation of the inner hairpin would be prevented by upper cam block. Instead, the outer hairpin guides are not present on the cam block underneath. However, the ratio in number is always 1 to 2, because there may be multiple insertion points only for the outer hairpins.

FIG. 24 provides a simplified diagram of simultaneous winding of two crowns according to the present description, but it should be understood that an entirely similar process also applies to three or more crowns: (a) when the first hairpin of the inner crown are entered into the circular space the legs not in rotation of the hairpins of the second (outermost) crown may be approached, being the respective insertion points and cam envelope angularly offset with respect to those of the inner crown by an appropriate angle; (b) the assembly of the two crowns continues in parallel (simultaneously); (c) the completion of the assembly of the outer crown is temporally offset correspondingly to the angular distance of the insertion points of the two crowns. The movement described herein can be generalized for the assembly of more than two crowns.

Finally, the use of the aforementioned I-pins and W-pins is possible using the device and a method according to the present description in appropriate manner. To this end, during the described pre-assembly, it will be avoided to insert a predetermined set of hairpins so as to leave one or more pairs of empty spaces adapted and configured to receive a I-pin or a W-pin.

According to an aspect of the invention, an alternative to the empty spaces to receive the I-pins and/or the W-pins, a pre-assembly of the I-pins and/or W-pins can be performed as mechanically connected assembly by virtue of non-conductive mechanical connection means (e.g. rigid). In such manner, they may be firstly positioned in free space 295. Again, it is possible to join the I-pins and/or W-pins in this manner in various subsets and insert the subsets in the free circular space. Furthermore, it is also possible that the mechanical connection means are reversible and that during the construction of the winding set the I-pins are left alone without mechanical connection. Finally, it is possible to assemble the I-pins and/or W-pins using the same cam guides and the same slots as the basic conductors, the cam guides and the slots being configured for both types of assembly, it being possible to insert the single leg of the I-pin and/or at least one leg of the three or more legs of the W-pin in the cam guides. The I-pin and the W-pin will be eventually positioned after the relative rotation of the slots in the free circular space.

Summarizing, the method according to the invention is a method for totally or partially pre-assembling at least one winding assembly 290 for electric machine stator or rotor, which includes a plurality of basic conductors 255, wherein each basic conductor 255 of said plurality of basic conductors 255 comprises two legs 255a, 255b having non-circular cross-section and a bridge-like connecting portion 255c between the two legs so as to form a "U" with two free ends 255aE, 255bE. The method comprises the following steps:

S1. providing a first apparatus for pre-assembling at least one winding assembly 290 for electric machine stator or rotor as defined above, with at least one ring 220, 230 having a fixed or variable pitch between the slots, and at least one cam block 270, 280 having at least one envelope guide 271, 281 and a free circular space 295;

S2. rotating said at least one ring 220, 230, each entirely or in a part thereof, with respect to the at least one cam block into an initial position such as to be able to insert both legs 255b, 255a into respective envelope guides 271, 281 or one of the two legs into an envelope guide 271, 281 and a different leg of the two legs 255b, 255a in the free circular space 295;

S3. inserting the two legs 255a, 255b of a basic conductor 255 into the respective slots 222,232 different from the at least one ring 220, 230 and at the same time into said cam block 270, 280 with a leg in an envelope guide 271, 281 and the other of the two legs in the free circular space 295 or in another envelope guide 271, 281;

S4. rotating by one slot pitch or multiple thereof the at least one ring 220.230 and/or the at least one cam block 270.280 in respective directions such to obtain an approaching movement towards the free circular space 295 of the last inserted basic conductor 255; and S5. repeating the steps from S2 to S4 or S3 and S4 until inserting a predefined number of basic conductors 255 of the winding unit 290.

According to the present invention, basic conductors 255 are used in steps S1-S5 having a predetermined angular opening or pitch between the legs and the following additional iteration step of the method is performed after step S5:

S9. Repeating steps from S1 to S5 or from S1 to S6; wherein a predetermined number of basic conductors 255 is used all having a same predetermined angular opening between the legs different from the corresponding preceding steps, until the winding assembly 290 is totally or partially assembled.

In such a situation, for example, all basic conductors 255 with a same angular opening may be inserted before the basic conductors whose angular opening comprises said same angular opening, with respect to their final position in the winding.

Furthermore, step S2 or S3 can begin before the end of the last step of pre-assembling of another winding assembly in the iterative repetition of the steps of the method for assembling multiple sets of concentric winding assemblies.

With reference to FIG. 9, the rotation of step S4 is such that there is an angle β between two successively inserted basic conductors 255 which corresponds to the rotation of a basic conductor 255 on itself about one of its two legs 255a, 255b such as to clear in one of said at least one envelope guides 271, 281 a space for inserting the basic conductor 255 to be successively inserted, wherein said angle β is determined by the size of the basic conductor 255, as well as by the conformation of said at least one envelope guide 271, 281.

In this first apparatus, said at least one envelope guide 481, 482 may be solely within the circumference enclosed by said circular free space 295 or only outside of said circumference. Alternatively, there may be various envelope guides in any number on the inside and in any number on the outside of said circumference.

FIGS. from 25 to 30 show a further embodiment of the apparatus and of the method according to the invention, which uses what has been described above.

FIG. 25(a) shows the connection type between the hairpins of a winding set which uses hairpins or basic conductors with a single bend direction. The basic conductors are inserted from above with respect to the linearized stator block and are welded underneath. The electric path goes from layer 1 to layer 2 to return to layer 1 and then to layer 2. From the latter, it passes to layers 3 and 4, then goes back to 3 and to 4 again.

FIG. 25(b) instead illustrates part of a winding set which uses hairpins with different bending directions. The basic conductors are inserted on the same side of the stator core from which the winding terminals emerge. The basic conductors inserted with one leg in layer 2 and with the successive one (with respect to a direction of electric current) in layer 1 and the basic conductors inserted with one leg in layer 4 and with the successive one (with respect to the same direction of current) in layer 3 all have the same bending direction. The basic conductors inserted with one leg in layer 2 and with the successive one (with respect to the same direction of current) in layer 3 all have a bending direction opposite to said bending direction. For this reason, the latter basic conductors are called "inverse" or "reverse". A set of I-pin and/or W-pin conductors complete the winding, being placed in the positions of the slots of the stator left free by the basic conductors. Such positions, in the concerned figure, belong to the outermost and innermost layers. The electric path from layer to layer can intuitively summarized in the sequence 1-2-1-2-3-4-3-4. In other representations of windings there may be a different number of modules 2-1 or 4-3, or of welding connections 2-3.

For reasons of industrial and application needs, electric paths can be requested in windings having multiple layers and multiple crowns, as in FIG. 25(b), using at least one pair of layers at least partially populated by "reverse" basic conductors (with different bending with respect to the bending of the hairpin of the crowns) and correspondingly at least two layers of I-pins and/or W-pins. In such case, the interlacing of the crowns of winding represents an assembly problem, which cannot be easily overcome by the apparatus and by the method as described above. The present invention thus comprises an apparatus and a method which add steps and characteristics to that described above in order to assemble winding sets with "reverse" hairpin included.

An example of the arrangement of reverse basic conductors and of I/W-pins is given by FIG. 31.

For example, as shown in FIG. 26, the apparatus 200 according to the invention may be used to have a set of incomplete windings which include a series of I-pins and/or W-pins in the innermost layer 290-4, while the rest of the hairpins in layer 290-3 are two-legs hairpins with a single bending direction which is the same for all. The incompleteness of the winding set is on the layer 290-3, so that there is a free portion, i.e. not occupied by the legs of hairpin.

At this point, if one wanted to add reverse hairpins, it would be necessary to approach both legs to the winding set 290 with a radial movement component, otherwise the axial insertion of at least one leg would be prevented by the presence of the connecting bridge of the hairpins inserted in layers 3 and 4. As shown in FIG. 27(b), the bridge-like portion of one of the hairpins of the first two overlying layers (see dotted hairpins) to the two visible legs of the reverse hairpins, would hinder the axial insertion of said legs of said reverse hairpins, if one were to attempt axially inserting them in the final position. The approach type of the invention is shown in FIG. 27(c). More in general, the position of the reverse hairpin in a given instant of time of beginning movement, from when the movement shown in FIG. 27(c) starts, must be compatible with the position of the bridge-like connections of the hairpins either assembled or during the step of assembling in the same time instant. Indeed, otherwise such bridge-like connections would hinder the assembling of the reverse hairpins, even if they are not positioned in their final position with respect to the winding. FIG. 27(a) shows a winding set to which multiple reverse hairpins 255r were added, starting to form layer 290-2. The set of reverse hairpins is formed by "Nr" hairpins which, in the wound stator, have a leg in a layer left free (Cf. Figure, in the representation, this is the angular crown portion in which there is a single layer of I-pins) of the inner crown, to as to occupy said free layer entirely, and the other leg in the inner layer of the crown adjacent to the inner surface. If the bending direction of the apical part (or bridge-like connection) of a hairpin of the inner crown is counterclockwise (or clockwise), seen from a leg, then the bending direction of the apical portion of one of said reverse hairpins is leftwards or rightwards, cf. FIG. 17(a)). In general, we can speak of a first bending direction for a basic conductor 255 and of a second bending direction for basic conductor 255r.

FIG. 28 shows a winding set obtained from that of FIG. 27 in which non-reverse hairpin were successively added to form the layer 290-1 almost completely. The winding set can be completed with I-pins and/or W-pins. This insertion can take place after inserting the reverse hairpins, wherein:

the winding assembly of FIG. 26 was obtained with a first apparatus according to the invention able to assemble basic conductors with first bending direction, and I-pins and/or W-pins;

the winding assembly of FIG. 27 was obtained with a second apparatus according to the invention able to assemble basic conductors with second bending direction; and the winding assembly of FIG. 28 was obtained with a third apparatus according to the invention able to assemble basic conductors with the first bending direction and I-pins and/or W-pins.

It is also possible to use a single apparatus with envelope guides such as not having to remove the winding set being formed.

Although the windings of FIG. 26-28 were assembled from the innermost layer to the outermost layer, the assembly can take place equally from the outside towards the inside by suitably changing the order of use of the three apparatuses.

The characteristics of the apparatus 400 and the steps of the method for pre-assembling, will be illustrated in greater detail with reference to FIGS. 29 and 30.

Apparatus 400 is similar to 200, with some differences. A cam block 480 is present here as well. Two envelope guides are illustrated (but may be in arbitrary number >2 according to requirements) designated with references 481, 482. They are only within the circumference enclosed by the free circular space 495 or only outside said circumference. In general, the apparatus 200 above may be formed in such manner.

Before ending the winding set 290 illustrated above, in which, alternately:

the apparatus of step S1 is defined as in claim 18; or
the following additional steps are performed:

R1. providing a second apparatus 400 for pre-assembling at least one winding assembly for electric machine stator or rotor in which there are at least two envelope guides 481, 482 only within the circumference enclosed in the free circular space 495 (renamed but substantially equal to 295) or only outside said circumference, with at least one ring 425 having a fixed or variable pitch between the slots 426, and at least one cam block 480 having at least two envelope guides 481, 482 and a free circular space 495;

R2. removing at least said one winding assembly 290 from the first apparatus 200 of step S5 or S6 or S9, where in these steps, conductors 255 with the bridge-like connecting portion having a first bending direction were used;

R3. inserting the at least one winding assembly 290 in said free circular space 495 of said second apparatus 400;

and wherein the following further steps are performed after step S5 or S6 or S9 and before step S7, in which basic conductors 255 were used with the bridge-like connecting portion 255c having a first bending direction, or after step R3:

R4. rotating said at least one ring 425, either entirely or partially, with respect to the at least one cam block 480 up to an initial position such as to be able to insert, in said at least one cam block (480), at least one basic conductor 255, 255r, with two legs in respective envelope guides (481, 482);

R5. inserting the two legs of a basic conductor (255, 255r) in respective slots 426 different of the at least one ring 425 and simultaneously in said cam block 480 with both legs in the respective two envelope guides 481, 482;

R6. rotating by one slot pitch or multiple thereof the at least one ring 425 and/or the at least one cam block 480 in respective directions as to obtain an approaching movement towards the free circular space 495 of the last inserted basic conductor 255,255r; and R7. repeating the steps from R4 to R6 or R5 and R6 until inserting a predefined number of basic conductors 255, 255r of the at least one winding set 290;

wherein said preset number of basic conductors (255, 255r) comprises a subset of basic conductors (255r) having a second bending direction, in which the second bending direction is opposite to said first bending direction.

The winding set 290 of step R2 may comprise a predetermined number of I-pins or W-pins in one or more winding layers 290-1, 290-4, said subset of basic conductors 255r being each inserted with at least one leg angularly at a leg of said predetermined number of I-pins or W-pins. Obviously, the envelope guides and the circular free space must be configured to be able to insert and process the I-pins and/or W-pins. In general, the I-pins or W-pins have legs positioned in a given layer (odd or even) in angular positions equal to those of the legs of the reverse basic conductors of a different layer (correspondingly odd or even). With reference to FIG. 28, it can be seen that the I-pins or W-pins are on the innermost layer of the winding in angular positions also occupied by legs of basic conductors 255r. Even if not shown, the I-pins or W-pins are inserted also in the outermost layer 290-1).

After step R7, alternatively:

the apparatus of step S1 may be configured to process I-pins and/or W-pins and with at least two envelope guides outside or inside the circumference of the circular free space; or the following additional steps after step R7 are performed:

L1. providing a third apparatus 400 for pre-assembling at least one winding assembly for electric machine stator or rotor as defined in step R1 and wherein it is further configured to assembly I-pins and/or W-pins, with at least one ring 425 having a fixed or variable pitch between the slots 426, and at least one cam block 480 having at least one envelope guide 481, 482 and a free circular space 495;

L2. removing said at least one winding assembly 290 from the apparatus 400 of step R7;

L3. inserting said at least one winding assembly 90 in said circular free space 495 of said third apparatus 400;

and wherein after step R7 or after step L3, the following further steps are performed:

L4. rotating said at least one ring 425, either entirely or partially, with respect to the at least one cam block 480 up to an initial position such as to be able to insert at least one basic conductor 255 or at least one I-pin or one W-pin, wherein said at least one cam block 480, the two legs being inserted in respective envelope guides 481, 482;

L5. inserting the legs of a basic conductor 255 or of an I-pin or a W-pin in respective slots 426 different of the at least one ring 425 and simultaneously in said cam block 480 with the legs in corresponding envelope guides 481, 482;

L6. rotating by one slot pitch or multiple thereof the at least one ring 425 and/or the at least one cam block 480 in respective directions as to obtain an approaching movement towards the free circular space 495 of the last inserted basic conductor 255; and L7. repeating the steps from L5 and L6 until inserting a predefined number of basic conductors 255 and/or I-pins and/or W-pins of the at least one winding set 290;

wherein said preset number of basic conductors 255 are basic conductors with said first bending direction.

After step R7, said at least one winding set can be used again in steps R1 to R7 and then, possibly but not necessarily, L1 to L7 for a predefined number of iterations to obtain at least one final winding set in the last step R7 with a predetermined number of layers and finally steps L1 to L7. This may imply making a winding also having I-pins positioned in intermediate layers between the outer one and the inner one, requiring the reverse hairpin to have legs in non-adjacent layers arranged straddling the other hairpins.

With such iterative process in the specific example of use of multiple different apparatuses, in general in number of 2*n−1 apparatuses, a winding assembly is obtained for n layers which contains n/2−1 sets of reverse hairpins which interlace n/2 crowns. The winding set conveniently contains one or two sets of I-pins and/or W-pins on different layers (preferably the opposite outer layers 290-1 and 290-4) to make the desired electric paths.

Advantages of the Invention

The apparatus and the method according to the present description makes it possible to automate the production of the hairpin winding set without needing to perform a simultaneous rotation of all the inserted hairpins to form the winding set.

Moreover, the device and a method according to the present description can be conveniently used with both round wire bar conductors and with bar conductors having a cross-section different from circular, such as for example "rectangular" and "trapezoidal" conductors, without needing to use adapters for the slots or the non-circular slots. In this manner, the device and a method according to the present description allow approaching the adjacent legs of the hairpin completely.

The device and a method according to the present description are valid for stators with number of wires per slot either greater than or equal to one, in particular for a number equal to or greater than two. In the case of multiple winding sets, the method envisages forming the individual winding sets or layers and then coupling them again on a stator or on a rotor.

Again, the device and a method according to the present description allow managing bar conductors having legs of different length because bottom walls which form an axial stop abutment for the legs of the bar conductors themselves are not present.

Furthermore, according to the apparatus and the method of the present description, the use of extraction grippers to insert the winding on the stator is not necessary.

A non-exhaustive list of the advantages of the invention according to the present description is provided below:

1. Assembly of a part of a crown of hairpins with addition in sequence or in parallel of "special" hairpins to complete the crown itself:
   a. Possibility of assembling crowns with hairpins having different span/pitch/throw;
   b. Possibility of assembling crowns with terminals on stator side on which the hairpins are inserted.
   c. Possibility of assembling crowns with fork-shaped or "W"-shaped hairpins, used for star point connection.
2. Assembly of multiple crowns;
3. Assembly of crowns with concentric hairpins, having homologous legs placed on the same layer and in adjacent slots, having a U-shaped bend of different pitch, e.g. equal to 7/6 of standard pitch for one and 5/6 of standard pitch for the other;
4. Assembly of overlapping crowns in ABBA pattern, as well as in ABAB and AABB patterns (see FIG. 6 of patent U.S. Pat. No. 6,894,417 B2); and
5. Assembly of crowns with layered hairpins (FIG. 1 of US20030214196A1).

LIST OF REFERENCES IN FIGURES

Figure 1:
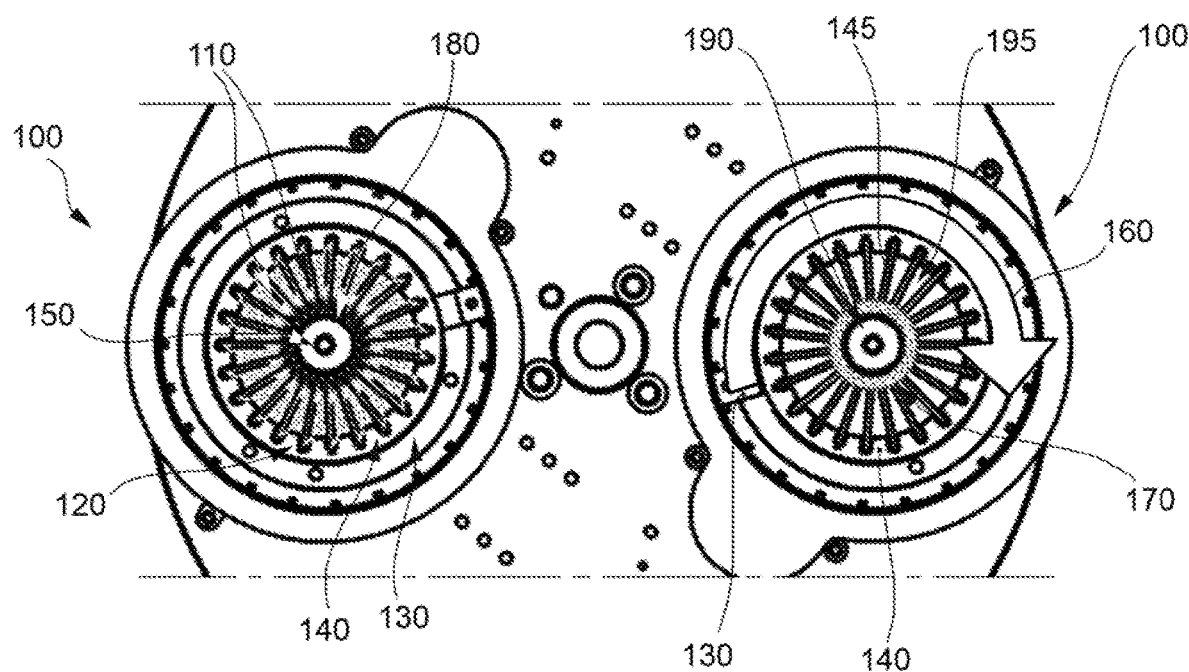
FIG. 1 shows a device for pre-assembling hairpin windings, according to the prior art.

FIG. 1
100=device for creating of a rotor winding with circular cross-section hairpins for starter motor (prior art)
110=circular section hairpins
120=pockets for inserting the pins
130=rotation supporting ring
140=rotatable outer ring in which the pockets 120 are located
195=third concentric element
180=pockets for inserting the pins
190=inner ring in which the pockets 180 are located
150=axis of device
160=rotation direction of the rotatable outer ring or of the inner ring
170=rotor winding with hairpins
FIGS. 2-24
200=device or apparatus for the creation of a stator/rotor winding with non-circular section hairpins, according to the invention
210=outer containment ring
211=lower layer of the outer containment ring 212=upper layer of the outer containment ring
220=outer array comprising the handling mechanisms of the retractable inserts 221
221=retractable insert (outer array element)
222=open slot of the retractable insert, rectangular S-portion
222a=closed end of the slot of the retractable insert, in radial direction
222b=open end of the slot of the retractable insert in radial direction
223=pawl of the retractable insert for handling the retractable insert
223=pawl
230=inner array
232=open slot of the inner array
232a=closed end of the slot of the inner array, in radial direction
232b=open end of the slot of the inner array, in radial direction, and facing the end 222b
240=support hub
250=hairpin insertion instrument (having circular, square section or any other section)
251=pushing piece of the hairpin
252=handle of the pushing piece of hairpin
253=first vertical rod of the insertion instrument
253a=sliding guide of the first vertical rod
254=second vertical rod of the insertion instrument
254a=sliding guide of the second vertical rod
255=hairpin
255a=first leg of the hairpin
255aE=free end of the first leg of the hairpin
255a1=first straight portion of the leg of the hairpin
255a2=a stepped portion of the leg of the hairpin
255a3=second straight portion of the leg of the hairpin
255b=second leg of the hairpin
255bE=free end of the second leg of the hairpin
255c=bridge-like connection of the legs of the hairpin
255c1=portion of the bridge-like connection connected to the second leg
B=main direction of extension of portion 255c1
$R_B$=radius of curvature of portion 255c1
255c3=portion of the bridge-like connection connected to first leg
A=main direction of extension of portion 255c3
$R_A$=radius of curvature of portion 255c3
255c2=central portion of the bridge-like connection
C=main direction of extension of portion 255c2
$\alpha_1$=angle between directions A and C
$\alpha_2$=angle between directions A and B
$\alpha_3$=angle between directions B and C, equal to the sum of $\alpha_1$ and $\alpha_2$
255i=I-pin
255p=distance between the legs of the hairpin (pitch)
255r=reverse hairpin
260=bushing
261=guide thickness
265=separating partition between crowns
270=inner cam block
271=envelope guide of the inner cam block
271a=exiting point (on the empty circular space; closable) of the cam block inside
271b=insertion point of the inner cam block
280=outer cam block
281=insertion guide of the inner cam block
281a=exiting point (on the median empty circular space; closable) of outer cam block
281b=insertion point of the outer cam block
β=angle between two hairpins inserted in succession, necessary to clear the space for inserting the next hairpin, depends on the size of the hairpin, in the prior art β is much larger and pre-assembly is simultaneous
290=crown of hairpins (winding set)
290'=further crown of hairpins (winding set)
295=free circular space in or between the cam blocks
300=stator pack
400=device or apparatus for creating of a stator/rotor winding with non-circular section hairpins, according to the invention, different from 200
425=ring of the device 400
426=slots of the ring 425
480=cam block of the device 400
481, 482=envelope guide of the cam block 480
485=portion of inner cam block with respect to the circumference enclosed by the free space 495
495=free circular space of the cam block 480
255, 255r=basic conductor which can be used with the apparatus 400
290-1=first layer of a winding set
290-2=second layer of a winding set
290-3=third layer of a winding set
290-4=fourth layer of a winding set
RF=reference point on the ring 425

Hereto, we have described the preferred embodiments and suggested some variants of the present invention, but it is understood that a person skilled in the art can make modifications and changes without departing from the respective scope of protection, as defined by the appended claims.

The invention claimed is:

1. An apparatus for pre-assembling at least one winding assembly for an electric machine stator or rotor, which comprises a plurality of basic conductors, wherein each basic conductor comprises two legs having non-circular cross-section and a bridge-like connecting portion between the two legs to form a "U" with two free ends, the apparatus comprising:
at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;
wherein said at least one ring along said central axis has a first insertion face of said at least one free end and a second exiting face, opposite to said first insertion face, wherein:
at least one cam block is arranged facing either said first insertion face or said second exiting face of the at least one ring;
said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;
a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space.

2. The apparatus of claim 1, wherein the slots of said plurality of slots are through openings in the at least one ring, wherein said second face is an exiting face of said at least one free end.

3. The apparatus of claim 1, wherein each slot of said at least one ring is constituted by a first slot and a second slot, whereby forming a plurality of first slots and of second slots, each of said first slot and second slot defining a respective opening along a depth direction substantially parallel to said central axis and along a radial direction with respect to said central axis, said first slot and second slot each having a respective facing open end and an opposite closed end in the radial direction, the first slot and the second slot being configured to receive at least one free end of one or more basic conductors along said depth direction.

4. The apparatus of claim 3, wherein said at least one ring comprises an inner ring of smaller radius which displays said second slots and an outer ring of greater radius which displays said first slots.

5. The apparatus of claim 4, wherein said inner ring and/or said outer ring are configured to rotate integrally and in the opposite directions with respect to the at least one cam block, or one in one direction and the other in the opposite direction with respect to the at least one cam block.

6. The apparatus of claim 3 and 4, wherein said outer ring comprises retractable inserts each integrally including at least a slot of said plurality of first slots.

7. The apparatus of claim 6, wherein each insert of said plurality of radially retractable inserts comprises a pawl.

8. The apparatus of claim 6, wherein the at least one ring comprises an inner ring of smaller radius displaying the second slots and an outer ring of greater radius displaying the first slots and wherein the plurality of radially retractable inserts is provided in said outer ring of greater radius.

9. The apparatus of claim 1, wherein the apparatus further comprises:
at least one peripheral surface of the ring; and
a containing device of the at least one peripheral surface;
and wherein said at least one peripheral surface connects the first insertion face and the second exiting face.

10. The apparatus of claim 9, wherein said containing device comprises a containment ring acting in containment along said at least one peripheral surface of the at least one ring.

11. The apparatus of claim 1, wherein:
said at least one cam block further comprises an inner block and an outer block, surrounding and radially facing the inner block;
the inner block has at least one inner envelope guide and/or the outer block has at least one outer envelope guide configured and adapted to be crossed at least in part, in use, by a leg of said two legs when they cross said at least one ring at least in part at the same time; and
said free circular space is defined between the inner block and the outer block.

12. The apparatus of claim 11, wherein:
the at least one outer envelope guide is configured to take, upon relative rotation of the at least one ring, the leg of one or more basic connectors inserted into it from the outside towards said free circular space.

13. The apparatus of claim 11, wherein the at least one inner envelope guide is configured to take, upon relative rotation of the at least one ring, the leg of one or more basic connectors inserted into it towards said free circular space.

14. The apparatus of claim 1, wherein the at least one cam block comprises a first cam block, extending radially with respect to the central axis at a first height on said central axis, comprises a first series of envelope guides and a first free circular space having a first radial dimension, and a second cam block, extending radially with respect to the central axis at a second height on said central axis, comprises a second series of envelope guides and a second free circular space having a second radial dimension, wherein the first height is different from the second height, and the first radial dimension is different from the second radial dimension, and wherein said first cam block and said second cam block are configured to rotate, in use, in simultaneous and synchronized manner with respect to said plurality of slots, or remain fixed.

15. The apparatus of claim 14, wherein the ratio between the number of elements in said first and said second series of envelope guides and the ratio of the first radial dimension and the second radial dimension are each of about 1 to 2.

16. The apparatus of claim 1, wherein a separating partition on a median line inside said free circular space.

17. The apparatus of claim 1, wherein said at least one envelope guide is configured and shaped so that one of the two legs is closer than the other with respect to the central axis, and wherein, for at least one set of basic conductors, said two legs of the basic conductors are taken into said free circular space according to an approaching movement to said free circular space of at least the legs furthest therefrom, wherein the basic conductors have equal angular width between the legs, with equal movement path for each of the homologous legs which compose them, as seen from the point of view of an observer integral with said at least one winding assembly being formed inside said free circular space.

18. The apparatus of claim 1, wherein the apparatus is configured to assemble at least one winding assembly further comprising:
a set of I-pins comprising a single leg with a I-pin first end and second end; and/or
a set of W-pins comprising three or more legs connected in bridge-like manner at one end of each one;
and wherein:
said at least one envelope guide is configured and adapted, in use, to be crossed at least in part, in a direction substantially parallel to said central axis, by said I-pin single leg starting from the first or second end, and/or by at least one leg of said three or more legs;
said single leg or said at least one leg of said three or more legs crosses, at the same time, at least in part, said at least one ring in a direction substantially parallel to said central axis along a respective slot of said plurality of slots;
the free circular space is configured to be crossed by said single leg and/or by said at least one leg of said three or more legs; and
the free circular space and said at least one envelope guide are configured so that, in use, upon relative rotation of the at least one ring, the I-pin or the W-pin inserted each time with its single leg or with said at least one leg of said three or more legs, respectively, in the at least one cam block and in the at least one ring is moved towards a final position in which said single leg or said at least one leg of said three or more legs crosses said free circular space.

19. The apparatus of claim 1, wherein a plurality of envelope guides is provided, and wherein at least two envelope guides of said plurality of envelope guides are present inside a circumference enclosed by said free circular space or outside of said circumference.

20. A method for totally or partially pre-assembling at least one winding assembly for an electric machine stator or rotor, which includes a plurality of basic conductors, wherein basic conductors of said plurality of basic conductors comprise two legs having non-circular cross-section and a bridge-like connecting portion between the two legs to form a "U" with two free ends, the method comprising the following steps:

S1. providing a first apparatus for pre-assembling at least one winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:

at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;

wherein said at least one ring along said central axis has a first insertion face of said at least one free end and a second exiting face, opposite to said first insertion face, wherein:

at least one cam block is arranged facing either said first insertion face or said second exiting face of the at least one ring;

said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;

a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, with at least one ring having a fixed or variable pitch between the slots, and at least one cam block having at least one envelope guide and a free circular space;

S2. rotating said at least one ring, each one entirely or in a part thereof, with respect to the at least one cam block into an initial position to insert both legs into respective envelope guides or one of the two legs into an envelope guide and a different leg of the two legs in the free circular space;

S3. inserting the two legs of a basic conductor into the respective slots different from the at least one ring and at the same time into said at least one cam block with a leg in an envelope guide and the other of the two legs in the free circular space or in another envelope guide;

S4. rotating by one slot pitch or multiple thereof the at least one ring and/or the at least one cam block in respective directions to obtain an approaching movement towards the free circular space of the last inserted basic conductor; and S5. repeating steps S3 and S4 until inserting a predefined number of basic conductors of the winding assembly;

and wherein, if the first apparatus of step S1 is configured to assemble at least one winding assembly further comprising:

a set of I-pins comprising a single leg with a I-pin first end and second end; and/or a set of W-pins comprising three or more legs connected in bridge-like manner at one end of each one;

and wherein:

said at least one envelope guide is configured and adapted, in use, to be crossed at least in part, in a direction substantially parallel to said central axis, by said I-pin single leg starting from the first or second end, and/or by at least one leg of said three or more legs;

said single leg or said at least one leg of said three or more legs crosses, at the same time, at least in part, said at least one ring in a direction substantially parallel to said central axis along a respective slot of said plurality of slots;

the free circular space is configured to be crossed by said single leg and/or by said at least one leg of said three or more legs; and the free circular space and said at least one envelope guide are configured so that, in use, upon relative rotation of the at least one ring, the I-pin or the W-pin inserted each time with its single leg or with said at least one leg of said three or more legs, respectively, in the at least one cam block and in the at least one ring is moved towards a final position in which said single leg or said at least one leg of said three or more legs crosses said free circular space:

in step S2, said initial position is such to insert said single leg or said at least one leg of said three or more legs;

in step S3, said single leg or said at least one leg of said three or more legs is inserted in a slot and simultaneously in said at least one cam block.

21. The method of claim 20, wherein the following additional step is performed after step S5:
S6. further rotating the ring by a predefined angle, to make the last inserted basic conductor or the last I-pin or the last W-pin exit from the at least one envelope guide.

22. The method of claim 20 and/or 21, wherein basic conductors are used in steps S1-S5 having a predetermined angular opening or pitch between the legs and the following additional step is performed after step S5:
S9. repeating steps from S1 to S5 or from S1 to S6 using a predetermined number of basic conductors all having a same predetermined angular opening between the legs different from the corresponding preceding steps, until the winding assembly is totally or partially assembled.

23. The method of claim 22, wherein all the basic conductors with a same smaller angular opening are used before the basic conductors with a same larger angular opening.

24. The method of claim 22, wherein all basic conductors with a same angular opening are inserted before the basic conductors the angular opening of which either comprises said same angular opening, with respect to their final position in the winding.

25. The method of claim 20, wherein one or more steps are iteratively repeated to assemble several concentric winding assemblies, wherein step S2 or S3 can begin before the end of the last step of pre-assembling of another winding assembly.

26. The method of claim 25, wherein rotation of step S4 is such that there is an angle β between two successively inserted basic conductors which corresponds to the rotation of a basic conductor on itself about one of its two legs to clear in one of said at least one envelope guides a space for inserting the basic conductor to be successively inserted, wherein said angle β is determined by the size of the basic conductor and by the conformation of said at least one envelope guide.

27. The method of claim 21, wherein a step S7 is further performed at the end of step S6, wherein the pre-assembled winding assembly is applied to the stator or rotor core.

28. The method of claim 27, wherein the first apparatus of step S1 is such that said at least one inner envelope guide and/or said at least one outer envelope guide have respectively at least one outer cam exiting portion and at least one inner cam exiting portion on said free circular space, and wherein step S7 comprises the following sub-steps:
S7A. closing an outer cam exiting portion and/or an inner cam exiting portion; and
S7B. inserting the winding set into a stator or rotor.

29. The method of claim 20, wherein a first apparatus for pre-assembling at least one winding set for an electric machine stator or rotor comprising a plurality of basic conductors, wherein each basic conductor comprises two legs having non-circular cross-section and a bridge-like connecting portion between the two legs to form a "U" with two free ends, the apparatus comprising:
at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;
wherein said at least one ring along said central axis has a first insertion face of said at least one free end and a second exiting face, opposite to said first insertion face, wherein:
at least one cam block is arranged facing either said first insertion face or said second exiting face of the at least one ring;
said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;
a free circular space is defined in the at least one cam block, which free circular space is concentric with said central axis and configured to be crossed by said two legs and on which at least one respective end of said at least one envelope guide opens; and
said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space,
wherein:
said at least one cam block further comprises an inner block and an outer block, surrounding and radially facing the inner block;
the inner block has at least one inner envelope guide and/or the outer block has at least one outer envelope guide configured and adapted to be crossed at least in part, in use, by a leg of said two legs when they cross said at least one ring at least in part at the same time; and
said free circular space is defined between the inner block and the outer block, wherein said at least one ring comprises an inner ring of smaller radius which displays said second slots and an outer ring of greater radius which displays said first slots, and
wherein said inner ring and/or said outer ring are configured to rotate integrally and in the opposite directions with respect to the at least one cam block, or one in one direction and the other in the opposite direction with respect to the at least one cam block,
is used, and
wherein step S2 is performed with respect to the inner block and to the outer block, and
wherein in step S4 said inner ring and said outer ring either are both made to counter-rotate or only one of the two is made to rotate.

30. The method of claim 28, wherein a first apparatus for pre-assembling at least one winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:
at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;

wherein said at least one ring along said central axis has a first insertion face of said at least one free end and a second exiting face, opposite to said first insertion face, wherein:

at least one cam block is arranged facing either said first insertion face or said second exiting face of the at least one ring;

said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;

a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, wherein each slot of said at least one ring is constituted by a first slot and a second slot, whereby forming a plurality of first slots and of second slots, each of said first slot and second slot defining a respective opening along a depth direction substantially parallel to said central axis and along a radial direction with respect to said central axis, said first slot and second slot each having a respective facing open end and an opposite closed end in the radial direction, the first slot and the second slot being configured to receive at least one free end of one or more basic conductors along said depth direction, and wherein said plurality of first slots and/or said plurality of second slots is defined in a plurality of radially retractable inserts, is used and wherein once the two ends of the basic conductors of the winding set are inserted in the stator or rotor core, or prior to this step, retractable inserts of said plurality of retractable inserts are displaced radially to release the winding assembly.

31. The method of claim 20, wherein, alternatively:

the apparatus of step S1 is a first apparatus for pre-assembling at least one winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:

at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;

wherein said at least one ring along said central axis has a first insertion face of said at least one free end and a second exiting face, opposite to said first insertion face, wherein:

at least one cam block is arranged facing either said first insertion face or said second exiting face of the at least one ring;

said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;

a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, and conductors are used with the bridge-like connecting portion having a first bending direction; or the following additional steps are performed:

R1. providing a second apparatus for pre-assembling a winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:

at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;

wherein said at least one ring along said central axis has a first insertion face of said at least one free end and a second exiting face, opposite to said first insertion face, wherein:

at least one cam block is arranged facing either said first insertion face or said second exiting face of the at least one ring;

said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;

a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, wherein a plurality of envelope guides is provided, and wherein at least two envelope guides of said plurality of envelope guides are present inside a circumference enclosed by said free circular space or outside of said circumference with at least one ring having a fixed or variable pitch between the slots, and at least one cam block having said at least two envelope guides and said free circular space;

R2. removing said winding assembly from the first apparatus of step S5 or S6 or S9, wherein conductors with the bridge-like connecting portion having a first bending direction are used in these steps;

R3. inserting said winding assembly in said free circular space of said second apparatus;

and wherein after step S5 or S6 or S9 and before step S7, or after step R3, the following further steps are performed:

R4. rotating said at least one ring, either entirely or partially, with respect to the at least one cam block up to an initial position to insert, in said at least one cam block, at least one basic conductor, with two legs in respective envelope guides;

R5. inserting the two legs of a basic conductor in respective different slots of the at least one ring and simultaneously in said at least one cam block with both legs in the respective two envelope guides;

R6. rotating by one slot pitch or a multiple thereof the at least one ring and/or the at least one cam block in respective directions to obtain an approaching movement towards the free circular space of the last inserted basic conductor; and R7. repeating the steps from R4 to R6 or R5 and R6 until inserting a predefined number of basic conductors in the at least one winding assembly;

wherein said predefined number of basic conductors either comprises or consists of basic conductors having a second bending direction, in which the second bending direction is opposite to said first bending direction.

32. The method of claim 31, wherein the winding assembly, when an apparatus for pre-assembling a winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:

at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;

wherein said at least one ring along said central axis has a first insertion face of said at least one free end and a second exiting face, opposite to said first insertion face, wherein:

at least one cam block is arranged facing either said first insertion face or said second exiting face of the at least one ring;

said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;

a free circular space is defined in the at least one cam block, which free circular space is concentric with said central axis and configured to be crossed by said two legs and on which at least one respective end of said at least one envelope guide opens; and said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, wherein the apparatus is configured to assemble at least one winding assembly further comprising a set of I-pins comprising a single leg with a I-pin first end and second end; and/or a set of W-pins comprising three or more legs connected in bridge-like manner at one end of each one;

and wherein:

said at least one envelope guide is configured and adapted, in use, to be crossed at least in part, in a direction substantially parallel to said central axis, by said I-pin single leg starting from the first or second end, and/or by at least one leg of said three or more legs;

said single leg or said at least one leg of said three or more legs crosses, at the same time, at least in part, said at least one ring in a direction substantially parallel to said central axis along a respective slot of said plurality of slots;

the free circular space is configured to be crossed by said single leg and/or by said at least one leg of said three or more legs; and the free circular space and said at least one envelope guide are configured so that, in use, upon relative rotation of the at least one ring, the I-pin or the W-pin inserted each time with its single leg or with said at least one leg of said three or more legs, respectively, in the at least one cam block and in the at least one ring is moved towards a final position in which said single leg or said at least one leg of said three or more legs crosses said free circular space, is used, comprises a predetermined number of I-pins or W-pins in one or more winding layers, a predetermined number of basic conductors being each inserted with at least one leg angularly corresponding with a leg of said predetermined number of I-pins or W-pins.

33. The method of claim 31, wherein, alternatively:

the apparatus of step S1 is a first apparatus for pre-assembling at least one winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:
- at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;
- wherein said at least one ring along said central axis has a first insertion face of said at least one free end and a second exiting face, opposite to said first insertion face, wherein:
- at least one cam block is arranged facing either said first insertion face or said second exiting face of the at least one ring;
- said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;
- a free circular space is defined in the at least one cam block, which free circular space is concentric with said central axis and configured to be crossed by said two legs and on which at least one respective end of said at least one envelope guide opens; and
- said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space,
- wherein the apparatus is configured to assemble at least one winding assembly further comprising
- a set of I-pins comprising a single leg with a I-pin first end and second end; and/or
- a set of W-pins comprising three or more legs connected in bridge-like manner at one end of each one;

and wherein:
- said at least one envelope guide is configured and adapted, in use, to be crossed at least in part, in a direction substantially parallel to said central axis, by said I-pin single leg starting from the first or second end, and/or by at least one leg of said three or more legs;
- said single leg or said at least one leg of said three or more legs crosses, at the same time, at least in part, said at least one ring in a direction substantially parallel to said central axis along a respective slot of said plurality of slots;
- the free circular space is configured to be crossed by said single leg and/or by said at least one leg of said three or more legs; and
- the free circular space and said at least one envelope guide are configured so that, in use, upon relative rotation of the at least one ring, the I-pin or the W-pin inserted each time with its single leg or with said at least one leg of said three or more legs, respectively, in the at least one cam block and in the at least one ring is moved towards a final position in which said single leg or said at least one leg of said three or more legs crosses said free circular space, wherein a plurality of envelope guides is provided, and wherein at least two envelope guides of said plurality of envelope guides are present inside a circumference enclosed by said free circular space or outside of said circumference; or the following additional steps after step R7 are performed:

L1. providing a third apparatus for pre-assembling at least one winding assembly for an electric machine stator or rotor comprising a plurality of basic conductors, wherein each basic conductor comprises two legs having non-circular cross-section and a bridge-like connecting portion between the two legs to form a "U" with two free ends, the apparatus comprising:
- at least one ring, which extends about a central axis, comprising a plurality of slots, each slot of said plurality of slots defining a respective opening along a depth direction substantially parallel to said central axis and along a radial direction with respect to said central axis, each slot being configured to receive at least one free end of one or more basic conductors along said depth direction;
- wherein said at least one ring along said central axis has a first insertion face of said at least one free end and a second exiting face, opposite to said first insertion face, wherein:
- at least one cam block is arranged facing either said first insertion face or said second exiting face of the at least one ring;
- said at least one cam block comprises at least one envelope guide configured and adapted, in use, to be crossed, at least in part in a direction substantially parallel to said central axis, by a leg of said two legs, which crosses at the same time, at least in part, said at least one ring in a direction substantially parallel to said central axis along a respective slot of said plurality of slots;
- a free circular space is defined in the at least one cam block, which free circular space is concentric with said central axis and configured to be crossed by said two legs and on which at least one respective end of said at least one envelope guide opens; and
- said free circular space and said at least one envelope guide are configured so that, in use, upon relative rotation of the at least one ring with respect to the at least one cam block, the basic conductor inserted each time with its respective two legs in the at least one cam block and in the at least one ring is displaced and rotated with respect to an axis substantially parallel to one of the two legs towards a final position in which both legs cross said free circular space, wherein the apparatus is configured to assemble at least one winding assembly further comprising
- a set of I-pins comprising a single leg with a I-pin first end and second end; and/or
- a set of W-pins comprising three or more legs connected in bridge-like manner at one end of each one;

and wherein:

said at least one envelope guide is configured and adapted, in use, to be crossed at least in part, in a direction substantially parallel to said central axis, by said I-pin single leg starting from the first or second end, and/or by at least one leg of said three or more legs;

said single leg or said at least one leg of said three or more legs crosses, at the same time, at least in part, said at least one ring in a direction substantially parallel to said central axis along a respective slot of said plurality of slots;

the free circular space is configured to be crossed by said single leg and/or by said at least one leg of said three or more legs; and the free circular space and said at least one envelope guide are configured so that, in use, upon relative rotation of the at least one ring, the I-pin or the W-pin inserted each time with its single leg or with said at least one leg of said three or more legs, respectively, in the at least one cam block and in the at least one ring is moved towards a final position in which said single leg or said at least one leg of said three or more legs crosses said free circular space, wherein a plurality of envelope guides is provided, and wherein at least two envelope guides of said plurality of envelope guides are present inside a circumference enclosed by said free circular space or outside of said circumference with said at least one ring having a fixed or variable pitch between the slots, and at least one cam block having said at least one envelope guide and said free circular space;

L2. removing said at least one winding assembly from the apparatus of step R7;

L3. inserting said at least one winding assembly in said free circular space of said third apparatus;

and wherein after step R7 or after step L3, the following further steps are performed:

L4. rotating said at least one ring, either entirely or partially, with respect to the at least one cam block up to an initial position to insert at least one basic conductor or at least one I-pin or one W-pin, in said at least one cam block, in respective envelope guides;

L5. inserting the legs of a basic conductor or of an I-pin or a W-pin in respective different slots of the at least one ring and simultaneously in said at least one cam block with the legs in corresponding envelope guides;

L6. rotating by one slot pitch or multiple thereof the at least one ring and/or the at least one cam block in respective directions to obtain an approaching movement towards the free circular space of the last inserted basic conductor; and L7. repeating the steps from L4 to L6 or L5 and L6 until inserting a predefined number of basic conductors and/or I-pins and/or W-pins of the at least one winding assembly;

wherein said predefined number of basic conductors are basic conductors with said first bending direction.

* * * * *